(12) United States Patent  
Poole et al.

(10) Patent No.: US 8,473,893 B2
(45) Date of Patent: Jun. 25, 2013

(54) INTEGRATION OF EXTERNAL SOFTWARE ANALYSIS PROCESSES WITH SOFTWARE CONFIGURATION MANAGEMENT APPLICATIONS

(75) Inventors: Damon B. Poole, Westford, MA (US); Joshua V. Sherwood, Franklin, MA (US)

(73) Assignee: AccuRev, Inc., Concord, MA (US)

( * ) Notice: Subject to any disclaimer, the term of this patent is extended or adjusted under 35 U.S.C. 154(b) by 680 days.

(21) Appl. No.: 12/551,923

(22) Filed: Sep. 1, 2009

(65) Prior Publication Data

US 2010/0083211 A1    Apr. 1, 2010

Related U.S. Application Data

(60) Provisional application No. 61/101,449, filed on Sep. 30, 2008.

(51) Int. Cl.
*G06F 9/44*    (2006.01)
*G06F 15/16*   (2006.01)

(52) U.S. Cl.
USPC .................. 717/101; 717/103; 709/203

(58) Field of Classification Search
None
See application file for complete search history.

(56) References Cited

U.S. PATENT DOCUMENTS

| | | | |
|---|---|---|---|
| 4,558,413 A | 12/1985 | Schmidt et al. |
| 4,809,170 A | 2/1989 | Leblang et al. |
| 5,278,979 A | 1/1994 | Foster et al. |
| 5,421,008 A | 5/1995 | Banning et al. |
| 5,428,737 A | 6/1995 | Li et al. |
| 5,428,776 A | 6/1995 | Rothfield |
| 5,553,282 A | 9/1996 | Parrish et al. |
| 5,600,834 A | 2/1997 | Howard |
| 5,649,200 A | 7/1997 | Leblang et al. |
| 5,659,735 A | 8/1997 | Parrish et al. |
| 5,721,900 A | 2/1998 | Banning et al. |
| 5,752,245 A | 5/1998 | Parrish et al. |
| 5,884,306 A | 3/1999 | Bliss et al. |
| 5,903,897 A | 5/1999 | Carrier et al. |
| 5,909,689 A | 6/1999 | Van Ryzin |
| 5,913,063 A | 6/1999 | McGurrin et al. |
| 5,956,513 A | 9/1999 | McLain, Jr. |

(Continued)

OTHER PUBLICATIONS

Office Action dated Aug. 31, 2010 from Co-pending U.S. Appl. No. 12/001,708.

(Continued)

*Primary Examiner* — Henry Tsai
*Assistant Examiner* — Michael Sun
(74) *Attorney, Agent, or Firm* — Wolf, Greenfield & Sacks, P.C.

(57) ABSTRACT

A platform is provided for enabling developers to customize easily and efficiently the performance of tasks on versions of a software project. An interface may be established in a software configuration management (SCM) application for communicating with software analysis processes, and information about a manner in which the software analysis process is triggered or stores data may be input as parameters to the interface. Additionally, generic parameters for a task to be performed by the software analysis process may be provided in a template. The template may then be provided to developers to populate with specific parameters regarding the particular task that developer would like performed, such as to identifying information for a version and a condition upon which the task is to be performed. Each developer of a team may make use of the template and the interface to customize the automation of tasks that he/she would like performed.

31 Claims, 15 Drawing Sheets

U.S. PATENT DOCUMENTS

| | | | |
|---|---|---|---|
| 6,003,034 A | 12/1999 | Tuli | |
| 6,055,544 A | 4/2000 | DeRose et al. | |
| 6,098,073 A | 8/2000 | O'Rourke | |
| 6,216,140 B1 | 4/2001 | Kramer | |
| 6,247,047 B1 | 6/2001 | Wolff | |
| 6,256,773 B1 | 7/2001 | Bowman-Amuah | |
| 6,272,678 B1 | 8/2001 | Imachi et al. | |
| 6,487,713 B1 | 11/2002 | Cohen et al. | |
| 6,493,732 B2 | 12/2002 | Aoyama et al. | |
| 6,502,133 B1 | 12/2002 | Baulier et al. | |
| 6,557,012 B1 | 4/2003 | Arun et al. | |
| 6,626,953 B2 | 9/2003 | Johndrew et al. | |
| 6,715,108 B1 * | 3/2004 | Badger et al. | 714/38.1 |
| 6,766,334 B1 | 7/2004 | Kaler et al. | |
| 6,789,252 B1 | 9/2004 | Burke et al. | |
| 6,901,407 B2 | 5/2005 | Curns et al. | |
| 6,978,281 B1 | 12/2005 | Kruy et al. | |
| 7,089,552 B2 | 8/2006 | Atallah | |
| 7,146,608 B1 | 12/2006 | Newman et al. | |
| 7,251,655 B2 | 7/2007 | Kaler et al. | |
| 7,289,973 B2 | 10/2007 | Kiessig et al. | |
| 7,437,722 B2 | 10/2008 | Poole | |
| 7,614,038 B2 | 11/2009 | Poole | |
| 7,769,787 B2 * | 8/2010 | Hailpern et al. | 707/803 |
| 7,856,615 B2 | 12/2010 | Clemm et al. | |
| 8,032,573 B2 * | 10/2011 | Richard | 707/737 |
| 2001/0049697 A1 | 12/2001 | Johndrew et al. | |
| 2002/0062475 A1 | 5/2002 | Iborra et al. | |
| 2002/0091990 A1 | 7/2002 | Little et al. | |
| 2002/0107840 A1 | 8/2002 | Rishe | |
| 2003/0051230 A1 | 3/2003 | Molchanov et al. | |
| 2003/0126003 A1 | 7/2003 | vom Scheidt et al. | |
| 2004/0015842 A1 * | 1/2004 | Nanivadekar et al. | 717/109 |
| 2004/0044996 A1 | 3/2004 | Atallah | |
| 2004/0056903 A1 | 3/2004 | Sakai et al. | |
| 2004/0260693 A1 | 12/2004 | Chen et al. | |
| 2005/0086588 A1 | 4/2005 | McGregor et al. | |
| 2005/0114479 A1 | 5/2005 | Watson-Luke | |
| 2006/0015851 A1 * | 1/2006 | Poole | 717/120 |
| 2006/0031811 A1 | 2/2006 | Ernst et al. | |
| 2006/0070019 A1 * | 3/2006 | Vishnumurty et al. | 717/101 |
| 2006/0150148 A1 | 7/2006 | Beckett et al. | |
| 2006/0253588 A1 * | 11/2006 | Gao et al. | 709/226 |
| 2007/0011649 A1 | 1/2007 | Venolia | |
| 2007/0061787 A1 * | 3/2007 | Trowbridge | 717/140 |
| 2007/0118888 A1 * | 5/2007 | Styles | 726/5 |
| 2007/0143827 A1 * | 6/2007 | Nicodemus et al. | 726/2 |
| 2008/0098037 A1 * | 4/2008 | Neil et al. | 707/200 |
| 2009/0307650 A1 * | 12/2009 | Saraf et al. | 717/101 |
| 2010/0198799 A1 * | 8/2010 | Krishnan et al. | 707/702 |

OTHER PUBLICATIONS

Massari et al. "Supporting Mobile Database Access Through Query by Icons," Distributed and Parallel Databases, 4:249-269 (1996).
Office Action from U.S. Appl. No. 12/059,529 dated Feb. 13, 2012.
Office Action dated Mar. 4, 2010 from Co-Pending U.S. Appl. No. 12/001,708.
JIRA, JIRA User's Guide, 2002-2005, JIRA, http://www.atlassian.com/software/jira/docs/v3.13/jira-manual-user-pdf, p. 1-143.
JIRA, JIRA Documentation, 2002-2005, JIRA, http://www.usit.uio.no/prosjekter/gorilla/doku/jira-manual.pdf, p. 1-376.
Office Action dated Aug. 15, 2011 from Co-Pending U.S. Appl. No. 12/001,710.
Office Action dated Oct. 25, 2011 from Co-Pending U.S. Appl. No. 12/059,529.
Office Action dated Mar. 9, 2011 from Co-Pending U.S. Appl. No. 12/001,708.
Office Action dated Aug. 31, 2011 from Co-Pending U.S. Appl. No. 12/001,708.
Poole et al., "Stream-Based Architecture for SCM," Jun. 6th 2005 AccuRev., available at: http://www.accurev.com/whitepaper/pdf/accurev_streams.pdf.
Office Action from U.S. Appl. No. 12/001,710 dated May 11, 2012.
Leblang, "Managing the Software Development Process with ClearGuide" Pure Atria, Lexington, MA, USA, May 1997, p. 66-80.

* cited by examiner

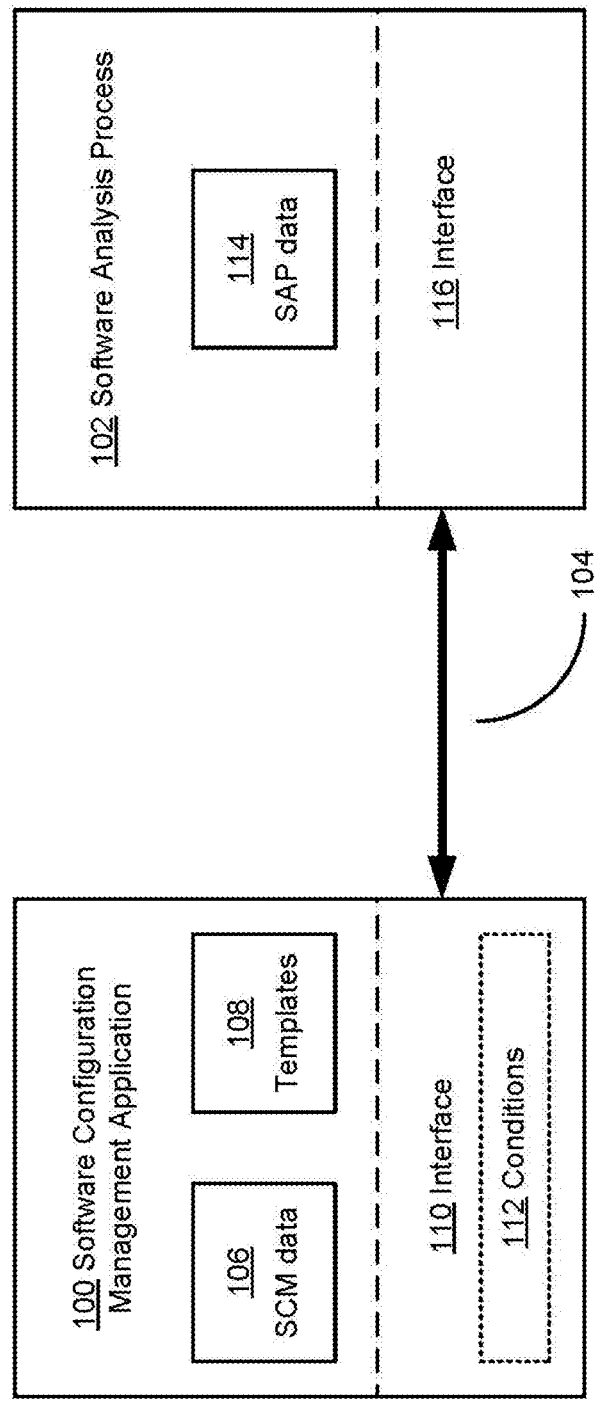

INTEGRATION OF EXTERNAL SOFTWARE ANALYSIS PROCESSES WITH SOFTWARE CONFIGURATION MANAGEMENT APPLICATIONS

RELATED APPLICATIONS

This application claims priority under 35 U.S.C. §119(e) to U.S. Provisional Application Ser. No. 61/101,449, entitled "Automation of software analysis processes for version-based software project development," filed on Sep. 30, 2008, which is incorporated by reference herein in its entirety.

BACKGROUND

1. Field of Invention

This invention relates to the field of configuration management systems and methods for managing development of a software project. More particularly, embodiments of the present invention relate to systems and methods for enabling users of a software configuration management (SCM) application to automate the execution of one or more software analysis processes in response to events generated by a software configuration management application without requiring the users to have knowledge of how the SCM application or the software analysis process operates.

2. Discussion of Related Art

A programmable computer by itself performs few useful functions until it is provided with, and executes, computer programs—software—designed to carry out useful functions (such as, but not limited to, database, word processing and spreadsheet operations). The programs that provide this functionality are often called "applications." Application programs generally are not complete in themselves, and rely on certain commonly-needed operations provided by basic "platform" software called an operating system.

Developing computer programs such as operating systems and software applications and products (which activity includes both initial development and later modifying or adding to the initial development) often requires the coordinated efforts of many developers (e.g., software programmers). This coordinated effort is referred to herein as a "software development effort" or "development effort," and a body of work (e.g., one or more software products, including software applications) being developed by the effort is referred to as a "software development project," "software project," or "project." A software development effort may comprise one or more software projects. At any given time, as part of a software development effort, multiple developers may be working on different software components of a software development project and/or different versions of these software components (e.g., for different users or situations). Thus, there may be multiple concurrent software development efforts ongoing, at least some of which use or involve the modification of common software components, including different versions of those software components and sometimes multiple versions of components.

Frequently, a software development project may involve several, or even dozens or more, of developers working on (e.g., writing, debugging, testing, etc.) a few to even hundreds of software components that are a part of the software project. Managing one or to more software development projects and the concurrent development of these different software components and versions is commonly referred to as software configuration management (SCM). Computers or computer systems running SCM software applications (i.e., programs) assist developers and project managers in the complex task of managing a software development project, including maintaining coherency between different software components and versions. (Hereafter, the terms "SCM software application" or "SCM application" may be used to refer to a software program able to be executed on a computer or computer system, or to such computers or computer systems that are executing or are adapted to execute an SCM application. The presence of an appropriate underlying operating system is assumed, though it certainly is possible to integrate operating systems and application program features in one product.)

While some SCM applications may be implemented that have a range of features and functionality additional to managing software development, as used herein an "SCM application" is a software application (i.e., one or more programs) that manages and stores information relating to configurations of software components used to produce a software product. An application that includes this functionality as well as additional functionality is an application that incorporates and includes an SCM application. Accordingly, some functionality of an application that incorporates and includes an SCM application, and functionality of other applications, is "external" to the SCM application in that it is not a part of the SCM application.

An SCM application may be one of a variety of applications and processes that may be used during a software development effort. These other applications and processes, external to the SCM application, may include software analysis processes that perform various tests on software development projects to determine whether the software development project has one or more characteristics or meets one or more standards. A "build" process is one example of such a software analysis process. A developer of a software project may execute a build process on the software project to determine whether the software project is capable of being "built" from a developer's source code into computer-executable software code, and thus determine whether the software project contains any structural programming errors (e.g., calls to non-existent code).

Software analysis processes, like build processes, typically are implemented externally to an SCM application as "external software analysis processes" that are carried out by "external applications." Such software analysis processes often have one or more to interfaces by which a user may trigger the software analysis processes to execute. In the case of a build process, a user may configure a version of a software development project using an SCM application, then turn to an external software analysis process (i.e., a process external to the SCM application) to carry out the build process. Following execution, the external process may then return a result to the user via the interface of the application, the result including an indication of whether the software project was able to be built and whether any programming errors were detected. If the build process does contain programming errors, the user may then return to the SCM application to identify and fix those errors using the software configuration functionality of the SCM application.

To execute a software analysis process, the user may configure the process with information regarding a version of a software project, using information maintained by the SCM application. Many conventional SCM applications do not store information regarding a version of a software project, but rather store information relating to individual components that are a part of the software project; in such systems, information regarding the version is maintained separately or by the user. Accordingly, the input information regarding the version of the software project may be a listing of software components (e.g., individual source code files) included in the version of the software project. To do this, the user may use a user interface of the software analysis process to locate a store of software components, maintained by the SCM application, included in various versions of software projects managed by the SCM application, and select the software components relating to the version of the software project the user would like analyzed. Once the components are selected, the user may then trigger the process via the interface and wait for the results. This technique is manual, and requires user intervention at each step to initialize and execute the software analysis process.

In some cases, users of SCM applications, including developers, have added functionality to an SCM application to offer limited interaction between the SCM application and software analysis processes external to the SCM application, to provide some automation of these processes. This automation may be linked to occurrence of events in the SCM application. For example, when a user makes a change to a version of a software project (e.g., by editing some code), an event may be generated that triggers a build process to determine if the version has any programming errors following the change. A user of an SCM application, wishing to automate a process to be performed on a version on occurrence of an event, may generate a script (e.g., a Perl script) in the SCM application that monitors the version for to occurrence of one or more events and, in response to the event, passes information regarding the version to the software analysis process. The information regarding the version may be, for example, a listing of software components included in the version, such as the list selected by the user in the manual process. The user may also develop a script for the software analysis process that waits for the information and performs the process upon receipt. In conventional systems, for each event and each version to be monitored and each software analysis process to be automated, a new script will be generated or an existing script modified to include additional information regarding the new event/process.

Generation of automation scripts, however, is an intensive process that is costly in time and requires a great deal of knowledge of the SCM application as well as the external software analysis process(es) to be automated. For example, to generate a script to automate a build process, a user may require knowledge of the format of data maintained by the SCM application and the manner in which it is edited. This may be necessary because the script will have to detect the occurrence of events associated with the editing of the data, and then retrieve the data and transmit it to the external software analysis application. The user may further require information about the data formats of the software analysis process, such that the script can provide the information regarding the version of the software project in a way that the software analysis process can operate on it. Further, the user may have to understand how the software analysis process operates and how to provide it with information and trigger it to execute. For example, if a build process executes by carrying out builds specified by a configuration file according to schedules contained within the configuration file, then the script (and its author) will have to know how to write information to the configuration file, in the format of the configuration file, regarding the version of the software project and the build desired. As another example, if the build process executes by accepting initial configuration information regarding a build to be performed on occurrence of an event, and then periodically polling the SCM application to determine whether the event has occurred, the user will have to know how to configure initially the software analysis process and then generate the script to provide the information in a way that the software analysis process can detect it during the polling process.

In short, a great deal of knowledge is required of SCM application users to generate scripts to automate software analysis processes, and generating the scripts is intensive and time-consuming. Accordingly, many users are deterred from generating scripts to automate these processes and instead manually perform tasks using software analysis processes. In to some cases, a software development effort may even employ a person working as a dedicated script-generator, such that these tasks can be automated using scripts, but individual developers do not need to have the required information to generate the script. Instead, the developers request that the script-generator write the script to automate the process. In such cases, however, generation of the script may be delayed until the script-generator is able to work on it, and thus a developer may be deterred from requesting scripts in many circumstances and only request scripts when absolutely necessary or when the script is not important and generation can be postponed.

In other cases, rather than generate a script—or request that a script be developed, if the effort is employing a script-generator—the developer may use the software analysis process directly via the interface. Doing so requires, of course, that the developer be knowledgeable about how to use the software analysis process via the interface. If a developer does not know how to use the software analysis process, then the developer may be further deterred from using the software analysis process, and thus may not use the analysis process at all; or the developer must divert a significant amount of time from software development, to learn how to use the software analysis process. This inefficiency may be repeated over a number of developers.

Thus, in some situations, developers of a software development effort may not even use some software analysis processes available to them, because of the various obstacles to their use. Software analysis processes, however, may provide useful information to developers of a software project that may help them improve the quality of the software project. For example, a software analysis process may, via a build process, discover programming bugs in the version that the developer can solve; or may, via a code coverage process, discover portions of code that a developer has forgotten to draft, such as when the developer has only written code to handle a "true" case of a true-false condition and has forgotten to write code to handle the "false" case, or such a process may, via a memory check process, discover memory errors that may cause a computer executing a software product of a software project to run slowly, among others.

It is advantageous for a developer to use these software analysis processes, and, in view of the above, there is need for a simplified manner by which the developer can use these software analysis processes without requiring knowledge on how an SCM application or a particular software analysis process operates.

SUMMARY

A platform is provided for enabling developers to customize easily and efficiently the performance of tasks on versions of a software project. The platform may operate in a computer system that includes a software configuration management (SCM) application and one or more external software analysis processes.

In some embodiments, an interface is established in the SCM application for communicating with each external software analysis process. Information about a manner in which a software analysis process is triggered or stores data may be input as parameters to the interface. In these embodiments, communication may thus be easily established between the SCM and a software analysis process without requiring knowledge of how to trigger the process or how to store data for access by the process or retrieve data from the process.

Additionally, a task to be performed by the software analysis process, and parameters of that task, may be identified. A task may be the application of the software analysis process, or a particular configuration of the software analysis process, in a given situation. Such tasks may be repeated in a variety of situations, such as when each of a plurality of developers is applying a task to his/her particular version of a software product to test software he/she has written. Generic parameters for the task to be performed by the software analysis process may be provided in a template. The template may then be provided to the developers such that the developers may populate it with specific parameters, thereby customizing the task in a way the a developer would like it performed. The specific parameters that customize the task may include identifying information for a version and a condition upon which the task is to be automatically performed. Each developer of a team may make use of the template and the interface to customize the automation of tasks that he/she would like performed.

In embodiments of the invention that provide both an interface between an SCM and an external software analysis process and a template, these interfaces and templates may be used by each of a plurality of developers to customize the performance of tasks without the developers needing to be aware of precisely how to communicate with the software analysis process or the general parameters for a task to be performed.

In one embodiment, there is provided a computer-implemented method for identifying a task to be carried out on a particular version of a software project, where information on the particular version is maintained by a software configuration management application and the task is to be performed by a software analysis process external to the software configuration to management application. The method comprises operating at least one processor to perform acts of receiving a selection, for the task, of a task template identifying a manner in which the software analysis process is adapted to receive input of data regarding the particular version and instructions regarding the task to be performed by the software analysis process, and receiving customization information for the task from a user. The customization information comprises identifying information about the particular version and a condition upon which the task is to be performed. The method further comprises operating the at least one processor to perform an act of configuring, based on the task template, the identifying information, and the condition, an interface to instruct the software analysis process to perform the task on the particular version upon satisfaction of the condition.

In another embodiment, there is provided at least one computer-readable storage medium encoded with computer-executable instructions that, when executed by at least one computer, cause the at least one computer to perform a method for identifying a task to be carried out on a particular version of a software project. In the method, information on the particular version is maintained by a software configuration management application and the task is to be performed by a software analysis process external to the software configuration management application. The method comprises receiving a selection, for the task, of a task template identifying a manner in which the software analysis process is adapted to receive input of data regarding the particular version and instructions regarding the task to be performed by the software analysis process, and receiving customization information for the task from a user, the customization information comprising identifying information about the particular version and a condition upon which the task is to be performed. The method further comprises configuring, based on the task template, the identifying information, and the condition, an interface to instruct the software analysis process to perform the task on the particular version upon satisfaction of the condition.

In a further embodiment, there is provided a method for enabling communication between a software configuration management application and a software analysis process external to the software configuration management application. The software configuration management application stores information on at least one version of a software project and the software analysis process is adapted to analyze a version. The method comprises operating at least one processor to perform acts of defining a type of analysis operation to be performed on a version stored by the software configuration management application. The to type of analysis operation is one that the software analysis process is adapted to perform based on input regarding the version. The method further comprises operating the at least one processor to perform an act of determining a manner in which the software analysis process is adapted to receive the input regarding the version and configuring a task template comprising at least a portion of the manner in which the software analysis process is adapted to receive the input regarding the version. The task template does not include information regarding the version. The method further comprises operating at least one processor to make the task template available to a user of the software configuration management application such that the user can populate the operation template with information regarding a particular version and request that the type of analysis operation be performed on the particular version.

In another embodiment there is provided at least one computer-readable storage medium encoded with computer-executable instructions that, when executed by at least one computer, cause the at least one computer to perform a method for enabling communication between a software configuration management application and a software analysis process external to the software configuration management application. The software configuration management application stores information on at least one version of a software project and the software analysis process is adapted to analyze a version. The method comprises defining a type of analysis operation to be performed on a version stored by the software configuration management application. The type of analysis operation is one that the software analysis process is adapted to perform based on input regarding the version. The method further comprises determining a manner in which the software analysis process is adapted to receive the input regarding the version and configuring a task template comprising at least a portion of the manner in which the software analysis process is adapted to receive the input regarding the version. The task template does not include information regarding the version. The method further comprises making the task template available to a user of the software configuration management application such that the user can populate the operation template with information regarding a particular version and request that the type of analysis operation be performed on the particular version.

In a further embodiment, there is provided a computer-implemented method for enabling communication between a software configuration management application and a software analysis process external to the software configuration management application. The software configuration management application stores information on at least one version of a software project and the software analysis process being adapted to analyze a version. The to method comprises operating at least one processor to perform acts of identifying a type of task that the software analysis process is adapted to perform, determining a trigger by which the software analysis process is adapted to start the type of analysis operation, determining an input manner in which the software analysis process is adapted to receive input regarding a version of a software project to be analyzed, and configuring the software configuration management application to transmit, upon receipt of an instruction from within the software configuration management application to trigger the task for a particular version of a software project, information about the particular version and the task to the software analysis operation in accordance with the trigger and the input manner. The method further comprises operating the at least one processor to perform an act of making available to a user of the software configuration management application a task template defining at least a portion of the input manner and identifying additional information that the user may provide to customize the task corresponding to the task template. The additional information comprises information about the particular version and a condition upon which the task should be carried out.

In another embodiment, there is provided at least one computer-readable storage medium encoded with computer-executable instructions that, when executed by at least one computer, cause the at least one computer to perform a method for enabling communication between a software configuration management application and a software analysis process external to the software configuration management application. The software configuration management application stores information on at least one version of a software project and the software analysis process being adapted to analyze a version. The method comprises identifying a type of task that the software analysis process is adapted to perform, determining a trigger by which the software analysis process is adapted to start the type of analysis operation, determining an input manner in which the software analysis process is adapted to receive input regarding a version of a software project to be analyzed, and configuring the software configuration management application to transmit, upon receipt of an instruction from within the software configuration management application to trigger the task for a particular version of a software project, information about the particular version and the task to the software analysis operation in accordance with the trigger and the input manner. The method further comprises making available to a user of the software configuration management application a task template defining at least a portion of the input manner and identifying additional information that the user may provide to customize the task to corresponding to the task template. The additional information comprises information about the particular version and a condition upon which the task should be carried out.

In another embodiment, there is provided a computer-implemented method for coupling a software configuration management (SCM) application and at least one external software analysis process such that, on occurrence of an event relating to a version of a software development project managed by the SCM application, the SCM application can trigger the at least one software analysis process to analyze the version. The version is stored by the SCM application as a logical grouping of one or more software components included in the version and information relating to properties of the version. The method comprises operating at least one processor of at least one computing device to perform acts of accepting first input from an administrator of the SCM application configuring a communications channel over which the SCM application will transmit information to the at least one external software analysis process, accepting second input from the administrator of the SCM application creating a template for providing information to the at least one external software analysis process regarding an event associated with a version of a software development project managed by the SCM application, and accepting third input from a user of the SCM application configuring an event handler to monitor for occurrence of at least one specific event associated with at least one specific version. The event handler is configured by populating the template with the third input specifying at least the at least one specific event and the at least one specific version. The method further comprises operating the at least one processor to, on occurrence of the at least one specific event, provide information regarding the specific version to the at least one external software analysis process over the communications channel without performing any action to configure the channel to provide the information, and notify a user, via a user interface of the SCM application, of a completion status of the at least one external software analysis process.

In a further embodiment, there is provided at least one computer-readable storage medium encoded with computer-executable instructions that, when executed by at least one computer, cause the at least one computer to perform a method for coupling a software configuration management (SCM) application and at least one external software analysis process such that, on occurrence of an event relating to a version of a software development project managed by the SCM application, the SCM application can trigger the at least one software analysis process to analyze the version. The version is stored by the SCM to application as a logical grouping of one or more software components included in the version and information relating to properties of the version. The method comprises accepting first input from an administrator of the SCM application configuring a communications channel over which the SCM application will transmit information to the at least one external software analysis process, accepting second input from the administrator of the SCM application creating a template for providing information to the at least one external software analysis process regarding an event associated with a version of a software development project managed by the SCM application, and accepting third input from a user of the SCM application configuring an event handler to monitor for occurrence of at least one specific event associated with at least one specific version. The event handler is configured by populating the template with the third input specifying at least the at least one specific event and the at least one specific version. The method further comprises, on occurrence of the at least one specific event, providing information regarding the specific version to the at least one external software analysis process over the communications channel without performing any action to configure the channel to provide the information, and notifying a user, via a user interface of the SCM application, of a completion status of the at least one external software analysis process.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 is a block diagram of one example of a programming system in which techniques described herein may operate;

DETAILED DESCRIPTION

Figure 2A:
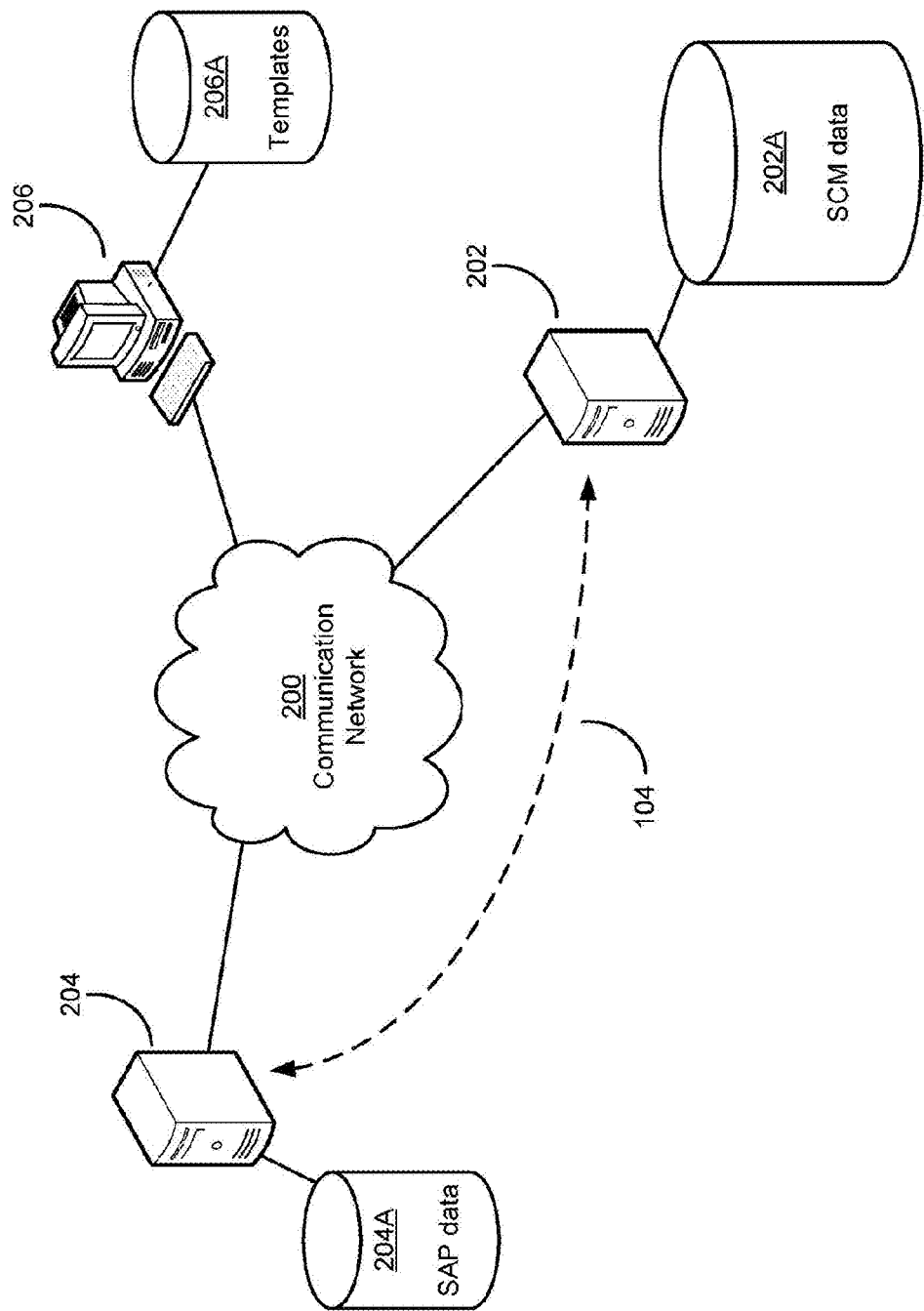
FIGS. 2A, 2B, and 2C illustrate examples of computer systems in which the block diagram of FIG. 1 may be implemented.

Described herein are various techniques for automating execution of a software analysis process. As described above, techniques for such automating exist, but suffer from various deficiencies that prevent a developer from efficiently and easily specifying an automation for a software analysis process, and thus typically a developer could not or would not perform such automation him- or herself. Rather, in these techniques an administrator or script writer typically performs the automation. When automation is performed in this way, the developer cannot customize the automation to perform an exact task required—instead, the administrator or script writer would choose the task—or the developer has to wait for a customized automation to be specified, which could be hours, days, or weeks after request.

Techniques operating in accordance with the principles described herein, however, enable a developer, from within an SCM application, to automate easily and efficiently tasks that apply the software analysis processes on selected versions of a software project based on an occurrence of an event. In some implementations of these techniques, the developer can select the processes, the versions, the events, and any other parameters, and thereby automate the tasks without being required to have knowledge of how the processes or the SCM store, manage, or interact with information.

Enabling developers to automate these tasks personally without having this knowledge means that more developers will be able to perform the automation and more developers will perform the automation and thereby use the software analysis processes, which will result in software code and software products that are more properly programmed and have fewer errors or bugs, or at least in greater efficiencies in the development process.

Developers may perform this control in any suitable manner, including by using a graphical user interface of the SCM application to control the external software analysis processes. Using these techniques, then, the developer need not be encumbered by the limitations of the above-described past approaches.

In one implementation of the techniques described herein, this easy and efficient customization may be enabled by configuring an interface of each of the SCM and the software analysis process(es) to support easily customizable communication, each having knowledge of the interface and/or manner of storing information for the other. The configuring may be done, for example, by an administrator. An administrator of a computer system in which a software development effort is being carried out may configure a communications link between the SCM application and an external software analysis process such that information may be passed back and forth. An administrator may also specify general parameters of software analysis processes, such as those parameters that relate to performance of the process. The administrator may accomplish this in any suitable manner, including by configuring and releasing one or more templates that may be used for creating tasks that automate performance of software analysis processes. These general parameters may specify various properties and options of the SCM application and the software analysis process using information that is within the administrator's knowledge and that, accordingly, does not have to be within a developer's knowledge. In doing so, the administrator—having knowledge of the operations and data formats of the SCM application and the external software analysis process(es)—may enable the operations necessary for information to be passed between the SCM and external applications. The templates then may be used by developers to customize the automation of a task without having knowledge of the manner of to operation or data formats of the SCM application and/or the software analysis process(es).

One or more developers, seeking to control the at least one external software analysis process to perform one or more tasks, may then make use of the interface and/or the template to customize performance of the task(s) they would like performed. For example, each developer could provide the specific parameters regarding an operation that developer would like carry out, such as parameters regarding software components and/or versions of a software project to be analyzed, thereby customizing the task for that developer's needs and desires at that time. Each developer could also populate a template to automate the task and automate performance of the software analysis process. For example, a developer may specify event handlers for a specified version, specified event, and specified software analysis process such that the software analysis process may be run on the version on occurrence of the event.

Accordingly, in this exemplary implementation, developers are not required to have knowledge of the SCM application and the software analysis process(es) to establish the links between the SCM application and the processes, but each is still able to generate personally the event handlers that the developer desires. This implementation advantageously offers developers greater control over the software analysis processes and may increase the likelihood that the developers will make use of the software analysis processes. Further, developers are not required to have knowledge of how to use a software analysis process or the user interface of one to benefit from the software analysis process, as the process may be controlled from within an SCM application with which the developer is already familiar.

This implementation is only one example of the ways in which the techniques described herein may operate, however; other implementations and other advantages will be apparent from further examples provided below.

Techniques operating according to principles described herein may be used in any of various SCM applications (already existing or to be developed) to interact with any suitable software analysis process. Some techniques, however, may be useful when implemented with SCM applications that not only store information relating to software components of a software project, as do many conventional SCM applications, but additionally store information of a logical grouping of these software components into the version of the software project.

In such systems that store information relating to versions, versions may be established and maintained in a manner that corresponds to steps of a workflow associated with a software development project. For example, for a software project there may be a plurality of user versions (i.e., workspaces) in which developers may write and test code, separate from other developers. Any changes made to the code in these user versions may then be "promoted" to an integration version in which the code of the various developers is combined and discrepancies in the code resolved. This may correspond to steps in a process of software development, such as code generation and initial testing followed by integration. Versions may also exist for more rigorous testing, such as Quality Assurance (QA) testing, and for release. Thus, some or all of the versions of a software project in a process-based SCM application may correspond to a step in a workflow. Versions may also be created that are separate from or not related to steps in a workflow, as SCM applications that use versions and store information related to versions may create and use versions for any suitable purpose.

An example of a process-based SCM application is AccuRev 4.7 available from AccuRev, Inc., of Lexington, Mass. AccuRev is a process-based SCM application that stores information related to versions and enables association of versions to steps of a process workflow. Various properties and functions of AccuRev and other process-based SCM applications are described generally below, though greater detail is available in the disclosures of U.S. patent application Ser. Nos. 10/894,697, 10/894,964, 12/001,708, and 12/001,710, all by Damon B. Poole, all of which are incorporated herein by reference in their entireties for at least the purpose of illustrating and explaining the details of operation of some process-based SCM applications, including a detailed discussion of the "streams" described generally below. It should be appreciated that terminology explicitly employed herein that also may appear in any of the disclosures incorporated by reference should be accorded a meaning most consistent with the particular concepts disclosed herein.

In a process-based SCM application such as AccuRev, information on versions of software projects may be maintained, indicating the software component versions that each version of the project comprises. Some SCM applications may additionally store information on the parent or child versions with which the project versions share a relationship, and a history of changes that have been made to the versions (e.g., software component versions which have been previously included in the version of the software project, but are not now, and the time the change was made). This history may be based on a time or times changes were made and/or a sequence of the transactions/operations that effected the changes. The information on the versions of the software projects may be stored in these process-based systems in many different ways, including as streams.

A "stream" is a data structure containing information describing a version of a software project (or other type of software entity) and a set of software components (i.e., one or more software components) associated with the version. A stream may relate a set of software components to one another and to metadata describing the version of the software development project and/or the software components. The metadata of a stream may be any suitable information about the software components and/or project, such as a status of the software components and/or a status of the project. It should be appreciated that different versions of a software project (or other type of software entity) may have the same content (e.g., may include a same set of software component versions) or different content.

Various software analysis processes that are carried out on a software project may be executed at specific stages of a software development effort; that is, various stages of a workflow for a software project. Accordingly, it may be advantageous, when automating these software analysis processes, to correlate these processes to specific stages of the software project. As described briefly above, in process-based SCM applications, versions of the software project exist that correlate to stages of a software project.

Thus, in some techniques implemented in accordance with some of the principles described herein, a developer may be enabled to automate, from within a process-based SCM application, one or more software analysis process to perform the processes on selected versions of a software project based on an occurrence of an event associated with the version, and thus based on an occurrence of an event associated with a stage of development of a software project. For example, a developer may specify that, when the software project reaches a specific stage of a software project—as detected by, for example, promotion of software code from a version lower in a version hierarchy to a version associated with the specific stage—a software analysis process should be triggered to carry out a process associated with that stage (e.g., when a software project reaches a QA stage or when code in a QA stage is changed, executing one or more testing process(es)).

Examples of techniques operating in accordance with some of the principles described herein are given below. However, it should be appreciated that these examples are merely illustrative of the types of ways that the principles described herein may be implemented, and that embodiments of the present invention are not limited to being implemented in any particular manner.

In one example given below, the external software analysis process to be automated to (e.g., the software analysis process 102 of the environment of FIG. 1) is described as a build process implemented by the Cruise Control continuous build process framework available from Thoughtworks, Inc., of Chicago, Ill. First, it should be appreciated that Cruise Control is only one example of a build process that may be automated in accordance with the principles described herein. Second, it should be appreciated that a build process is only one example of the types of software analysis processes that may be automated. Any suitable software analysis process may be automated using one or more techniques operating in accordance with some of the principles described herein.

A memory check process is another example of a software analysis process. In a memory check process, a software product associated with a software project is analyzed to determine whether it correctly performs operations to interact with the memory of the computer, including whether it properly releases memory when finished with the memory such that the executing computer does not slow down from lack of memory and/or whether it properly uses memory that it has been allocated such that it does not cause crashes by overwriting the memory space of another software product.

A third type of software analysis process is a code coverage process, described briefly above. In a code coverage process, a software project may be analyzed to determine whether it contains software code relating to all anticipated portions of a software project. For example, if a software project includes a conditional check to determine whether a condition is true or false (e.g., whether a variable is above or below a certain threshold), the code coverage process may examine the code to determine whether all cases are handled (e.g., whether the "true" case is handled and whether the "false" case is handled).

Another example of a software analysis that may be automated by techniques operating in accordance with the principles described herein is a code complexity process. A code complexity process analyzes a software project to determine how "complex" code is—that is, how confusing or obfuscated the code may be. Code that is complex may impact a reviewer's ability to understand the code and, in some cases, the time and system resources necessary to process the code when executing the software product resulting from the software project.

Static analysis processes may also be automated as software analysis processes in accordance with principles described herein. A static analysis process may be one that examines un-compiled software code—the code written by a developer—to determine the likelihood, based on various mathematical factors, that the software code includes errors that may affect the execution of the software product.

Another example of a type of software analysis process that may be automated is a standards review process. In a standards review process, software code of a software project is reviewed to determine whether the code complies with one or more standards that have been established for the code. For example, a software production company may have established one or more coding styles to which it expects the developers to conform when writing code for a software project. A standards review process may analyze software code to determine whether the code complies with these coding styles.

Any suitable type or types of software analysis process may be automated using techniques operating in accordance with the principles described herein. Accordingly, it should be appreciate that the software analysis processes described above are only examples of the types of analysis processes that may be automated in embodiments. Embodiments of the present invention are not limited to operating with any particular type(s) of software analysis process.

Further, embodiments are not limited to operating in any particular computer system or computing environment. FIG. 1 shows one example of a computer system in which some embodiments may be employed, but it should be appreciated that others are possible.

The illustrative computer system of FIG. 1 comprises a software configuration management application (SCM) 100 and a software analysis process (SAP) 102. As described above, the SCM 100 may be any suitable application that manages and stores information relating to configurations of software components used in a software project. The SAP 102 may be any suitable application external to the SCM that performs one or more analysis processes, including performing one or more various tests on software development projects to determine whether the software development project has one or more characteristics or meets one or more standards. Further, while in many cases the SCM 100 and SAP 102 may be implemented in different applications or executed on different computing devices (as shown in exemplary implementations shown in FIGS. 2A-2C), as discussed above, in some cases the SCM 100 and the SAP 102 may be implemented in one application. Accordingly, an application may include both an SCM and an SAP that is "external" to the SCM in that it is not a part of the SCM.

FIG. 1 shows various components of exemplary implementations of an SCM 100 and SAP 102. As shown in FIG. 1, in some embodiments an SCM 100 may include a data store 106 of SCM data, which may, for example, include information on a plurality of software components (e.g., computer code files) and/or a plurality of versions of a software project that uses those components. Similarly, SAP 102 may include a data store 114 of SAP data, which may include information on tests to be performed by the SAP 102 and/or results of tests previously performed.

As discussed above, embodiments relate to configuring the SCM 100 and SAP 102 to communicate, such that the SCM 100 can cause the SAP 102 to carry out an analysis process automatically, upon detection of an event by the SCM 100. Accordingly, embodiments relate to establishment of a connection 104 between the SCM 100 and SAP 102 that permits an unsophisticated user (e.g., a user without scripting experience) to enable automation of the analysis process(es) to be carried out by the SAP 102.

In some embodiments described in greater detail below, this connection 104 is established through the creation of interfaces between the SCM 100 and SAP 102 and the use of templates.

In conventional techniques, including scripting techniques, for automating software analysis processes, a user seeking to establish the automation for his or her own use would have to know how to communicate from a software configuration management application to an external software analysis process. Further, the user would have to be aware of how to configure to software analysis process to perform an analysis process. Some embodiments that use templates may alleviate one or both of these problems, and some embodiments templates may alleviate all of them.

It should be appreciated, though, that a template as used in these techniques is not simply a blank data structure identifying gaps that need to be filled in. As discussed above, while in conventional techniques the automation of a task was performed entirely by a developer or entirely by an administrator or script writer, in accordance with the principles described herein a more efficient automation may be performed by having an administrator perform those parts of the automation that enable the developer to perform the remainder of the automation without being required to have knowledge of the storage techniques or interface styles for an SCM or a software analysis process. In this way, the developer may easily and efficiently customize a task with those specific parameters that control how the task will be executed. The general parameters that will not typically vary between two tasks that automate a same software analysis process can be collected from the administrator, and it is these—or a portion of these—that are contained in the template.

Accordingly, a template, in some of these techniques, is a data structure that contains those parameters that are required to automate a task that uses a software analysis process but that may not be within the knowledge of a developer seeking to automate that task or that a manager may desire to unburden from the developer. In this way, the developer can customize a task and automate the task without having, or having to use, all the requisite knowledge.

In some embodiments, an interface 110 may be established in the SCM 100 by an administrator of the SCM 100, and a similar interface 116 may be established in the SAP 102 by an administrator of the SAP 102. The SCM 100 may be adapted to "trigger" the performance of an analysis process by the SAP 102 in any suitable manner, depending on the manner of operation of SAP 102.

For example, the interface 100 may be aware of ways in which data is stored in the SCM 100 (e.g., the structure and contents of data store 106) and may also be aware of a manner in which SAP 102 operates. An SAP 102 may merely perform processes as outlined in the data store 114 (which may, for example, contain a schedule of processes to be performed). In this case, the interface 114 may be configured with information about the structure, content, and location of data store 114, such that the interface 110 can directly insert content to the data store 114. In another case, the SAP 102 may be adapted to carry out processes when triggered through the use of an Application Programming Interface (API) or other means. In this case, the interface 110 may be additionally or alternatively aware of these means and may provide an instruction and/or data describing a process via these means.

The interface 116 may be adapted to receive information (e.g., instructions, data, etc.) from the interface 110. The interface 116 may be an interface of the SAP 102 (e.g., an API) or may be an interface between the SAP 102 and the interface 110. For example, the interface 116 may be provided in addition to another interface of the SAP 102, such that, for example, the interface 116 may receive data from the interface 100 of the SCM 100 and provide it to the interface (e.g., an API) of the SAP 102. Further, in other embodiments, the SAP 102 may not have an interface and the interface 116 may receive information from the interface 110 and provide it to the SAP 102. For example, the SAP 102 may be one that merely performs processes as outlined in its data store 114; the interface 110 of the SCM 100 may provide information to the interface 116, which may then directly insert the information to the data store 114. In some embodiments, the interface 116 may also be adapted to provide information on an analysis process (e.g., a current state of the analysis process, or a completion state of an analysis process) to the interface 110 to be provided to the SCM 100.

In sum, the interfaces 110 and 116 may be provided, respectively, to the SCM 100 and SAP 102 to enable, in any suitable manner, communication between the SCM 100 and SAP 102. The communication that may flow over the connection 104 between the SCM 100 and the SAP 102 may relate to an analysis process to be performed on software components maintained by the SCM 100. For example, the connection 104 may carry from the SCM 100 to the SAP 102 information configuring the SAP 102 to carry out the analysis process and (either with the configuration information or separate) an instruction to carry out the analysis process. The connection 104 may also carry, from the SAP 102 to the SCM 100, information regarding the analysis process, such as a progress of the analysis or results of the analysis. Interfaces 110 and 116 may be any suitable component of an application or process to enable information such as this to flow between SCM 100 and SAP 102.

Thus, in some embodiments, a user seeking to automate an analysis process is able to perform this automation without knowing how to exchange information between an SCM 100 and an SAP 102, or the precise manner of operation of the SCM 100 or SAP 102, as interfaces 110 and 116 will handle these operations.

In some embodiments, an SCM 100 may further be provided with a data store 108 of one or more templates that each contain information on how to automate a type of software analysis process. For example, these templates may contain basic information regarding an analysis process that may be performed by the SAP 102. This information may be useful for, or required by, the SAP 102 in performing an analysis process, but may not be within an unsophisticated users' knowledge. Accordingly, an administrator may provide a template that lays out some of the properties and attributes of an analysis process and a user may provide additional information to the template to allow an analysis process to be fully specified. As part of populating the template, the user may specify one or more conditions that are to be fulfilled to trigger automatic performance of the analysis process. Any suitable condition may be used, including changes made to software components or versions stored by the SCM 100 or input from a user requesting that the process be performed.

A template may be used in any suitable manner for automating a software analysis process. In different implementations, different components of the system shown in FIG. 1 may use a populated template to configure the SAP 102 to perform the analysis process specified by the populated template. For example, the SCM 100 may be configured with a populated template to generate and pass instructions to the interface 110. Based on the populated template. In another example—the one shown in FIG. 1 and discussed below—the to interface 110 may be configured with a populated template to generate and pass instructions to the interface 116 based on the populated template. In other examples, the interface 116 or the SAP 102 may be configured to generate and pass instructions based on the populated template.

In the example of FIG. 1, when a user has fully specified an analysis process by populating a template, the populated template may be provided to the interface 110. The interface 110 may then update a data store 112 of conditions that, when fulfilled, trigger the performance of various analysis processes by the SAP 102 or by other software analysis processes. The interface 110 may review the populated template and determine conditions specified by a user in the populated template, then insert an indication in the data store 112 of the condition(s) and the analysis process to be triggered upon fulfillment of the condition(s). The interface 110 may then examine operations of the SCM 100—such as by examining changes made to the data store 106 of SCM data, or in any other way—and determine when the condition(s) is met. When the condition(s) is (are) met, the interface 110 may communicate over the connection 104 to the interface 116 and configure and/or trigger performance of the analysis process.

Any suitable event or set of events may be used as a condition for execution of a software analysis process when the process is to be automated. For example, the condition may be that a change has been made to computer code maintained by the SCM 100. As another example, the software analysis process may be configured to automatically execute upon request from a user (e.g., a user may manually trigger the start of the process, and it will run automatically without further input or with limited further input).

It should be appreciated that the system shown in FIG. 1 is only one example of the various types of systems with which these techniques may be employed. Any suitable components or processes may be used for configuring an analysis process to be performed based on a template and input provided by a user, and any suitable components or processes may be used for triggering occurrence of the analysis process. Other exemplary techniques and processes for using templates, as well as examples of templates, are discussed in further detail below.

Figure 2B:
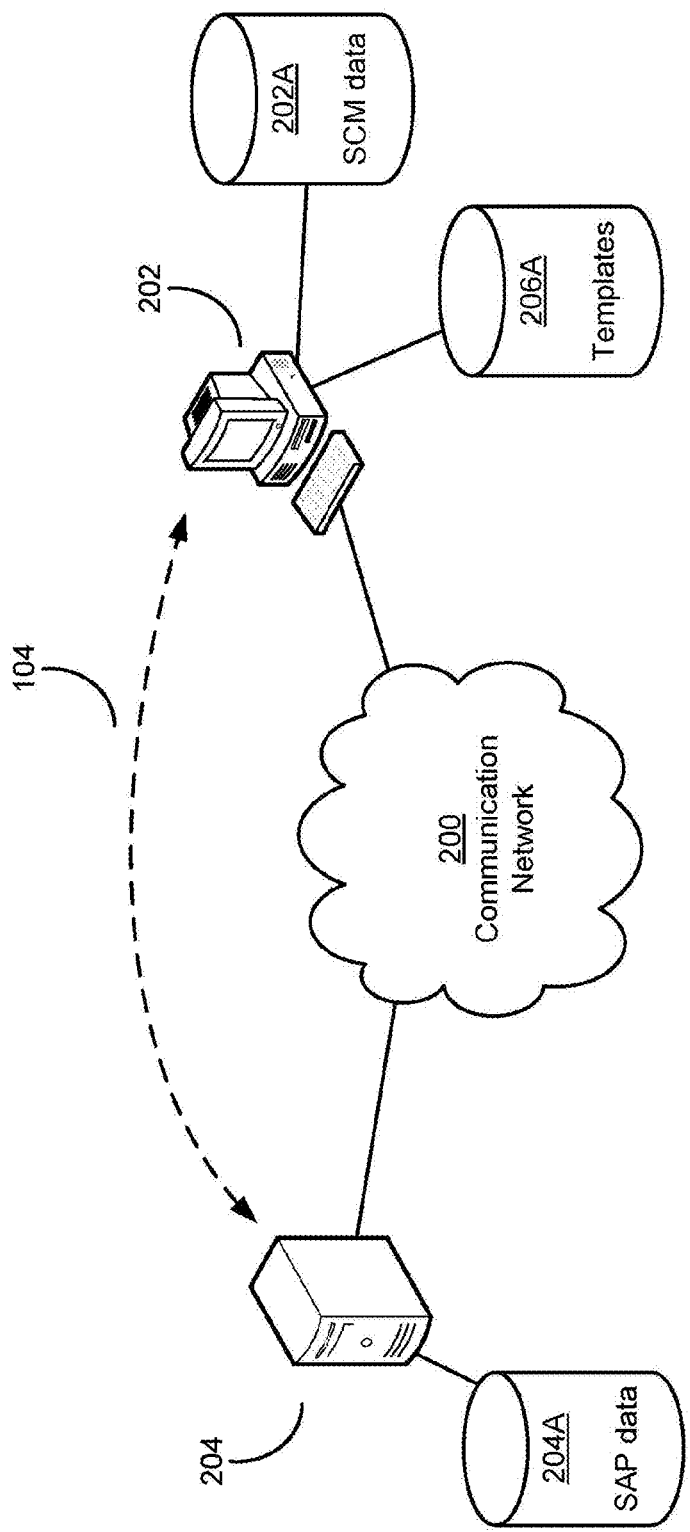
Figure 2C:
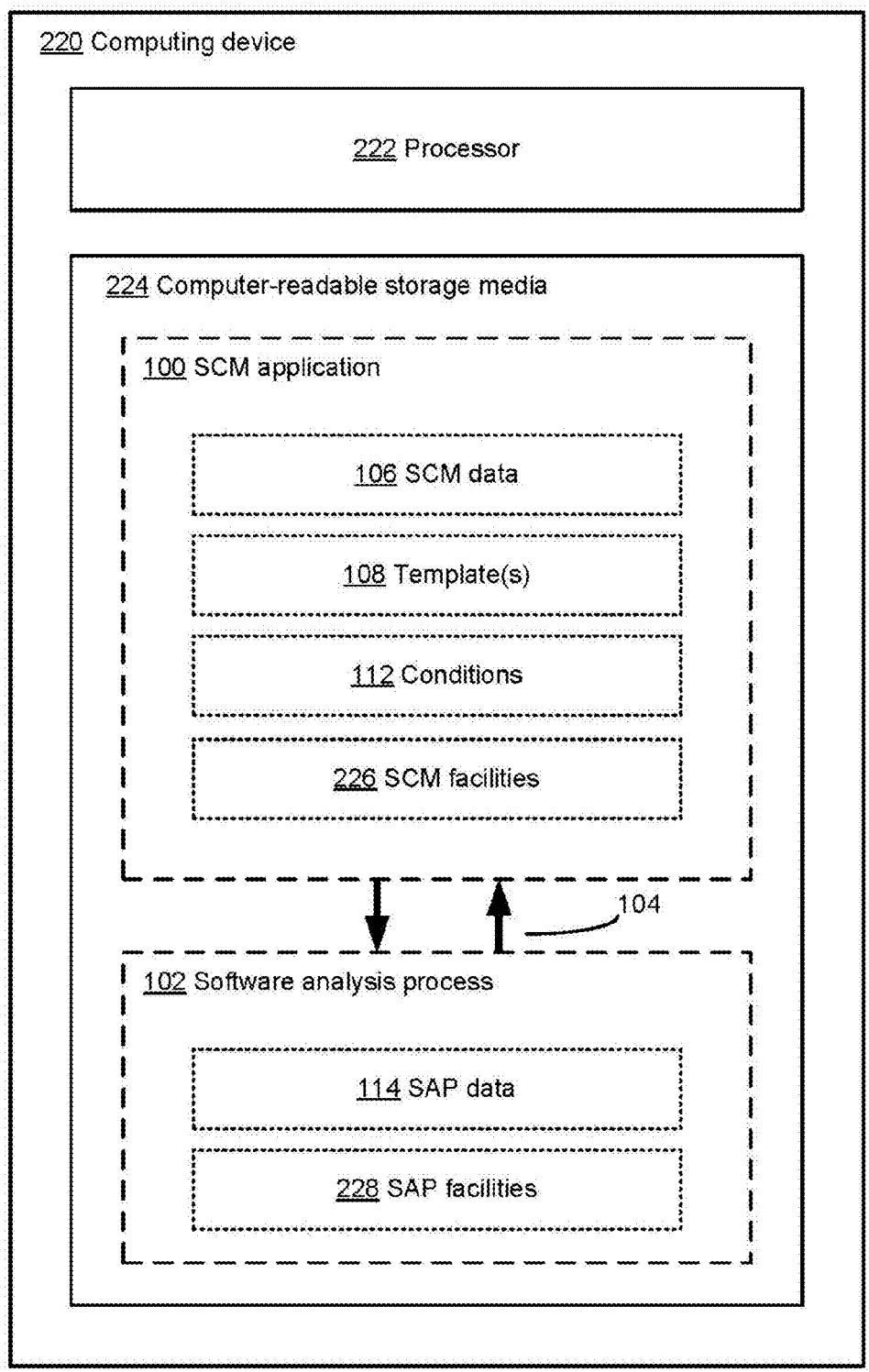

The system shown in FIG. 1 as a block diagram may be used in any suitable computing device or computer system for performing a software analysis process. FIGS. 2A to 2C show three different exemplary computing devices and computer systems in which embodiments that operate similarly to that shown in FIG. 1 may act.

FIG. 2A shows a first illustrative computer system, In which a computer communication network (e.g., a wired and/or wireless network) joins a server 202, a server 204, and a personal computer 206. The server 202 in this computer system is hosting an SCM application (such as SCM 100) and includes a data store 202A of SCM data. The server 204 in this computer system is hosting a software analysis process (such as SAP 102) and includes a data store 204A of SAP data. As shown in FIG. 2A, a connection 104 has been established between server 202 and server 204 (via the network 200), as discussed above in connection with FIG. 1.

Personal computer 206 here may be a computing device operated by a user of an SCM application, and may execute a client SCM application related to a server application on the server 202. Via the client SCM application, the user may interact with the data store 202A of SCM data. For example, the user may interact with the data store 202A to automate one or more software analysis processes for the SCM data. In some embodiments, as discussed above, this may be done by the user through the use of templates. Accordingly, in these embodiments, the personal computer 206 may have associated with it a data store 206A of templates. These templates may be prepopulated with some information regarding a type of analysis process that may be performed, and the user may populate the template with additional information to describe a particular task to be carried out. The SCM application—either on the personal computer 206 or on the server 202—may then be configured to trigger the server 204 to carry out an analysis process associated with the task. For example, in some embodiments, the personal computer may convey the populated template to the server 202, which may configure itself and/or the server 204 to carry out an analysis process corresponding to the task described by the populated template.

FIG. 2B shows a second exemplary computer system. In the computer system of FIG. 2B, a computer 202 (e.g., a server or a personal computer) may include both a data store 202A of SCM data and a data store 206A of templates. Input may be received at the computer 202 either via a local interface (e.g., a user interface of the computer 202) or via the network 200 populating a template to carry out an analysis process. In a similar manner to other systems described above, once a template is populated the computer 202 and/or the server 204 may be configured with the populated template to cause the server 204 to carry out the task described by the template upon fulfillment of various conditions.

FIG. 2C shows a third exemplary computer system in which the system of FIG. 1 may to be implemented, in which the software configuration management application 100 and software analysis process 102 are implemented on a same computer (though not necessarily in the same application). As shown in FIG. 2C, a computing device 220 includes a processor 222 and computer-readable storage media 224 storing instructions and data to be processed by the processor 222. The storage media 224 store an SCM application 100 that, as shown in FIG. 1, includes a data store 106 of SCM data, a data store 108 of templates, and a data store 112 of configured conditions for analysis processes. The SCM application 100 also includes one or more SCM facilities 226 that include instructions for carrying out SCM functions and processes for the SCM application. The storage media 224 also store a software analysis process 102 that includes a data store 114 of SAP data, as well one or more SAP facilities 228. As shown in FIG. 2C, the SCM 100 and SAP 102 are adapted to communicate with one another through any suitable inter- or intra-process communication technique via a connection 104.

Having described various illustrative systems in which one or more, but not necessarily all, embodiments may operate, a description of various techniques that may be employed alone or in almost any appropriate and desired combination by various embodiments to automate execution of a software analysis process is given below.

Discussion of these illustrative techniques below may be described in connection with illustrative implementations and illustrative components of the system. For example, some of the techniques described below may be described in connection with templates, though it should be appreciated that not all embodiments may operate with templates, and that embodiments that do use templates are not limited to using any particular template or any template including any specific content. Software analysis processes may be automated in any suitable manner. Further, examples are described below in terms of an SCM application and an SAP application, though it should be appreciated that in some implementations the SCM and SAP may be contained within one application, though they may be different components of the application.

Figure 3:
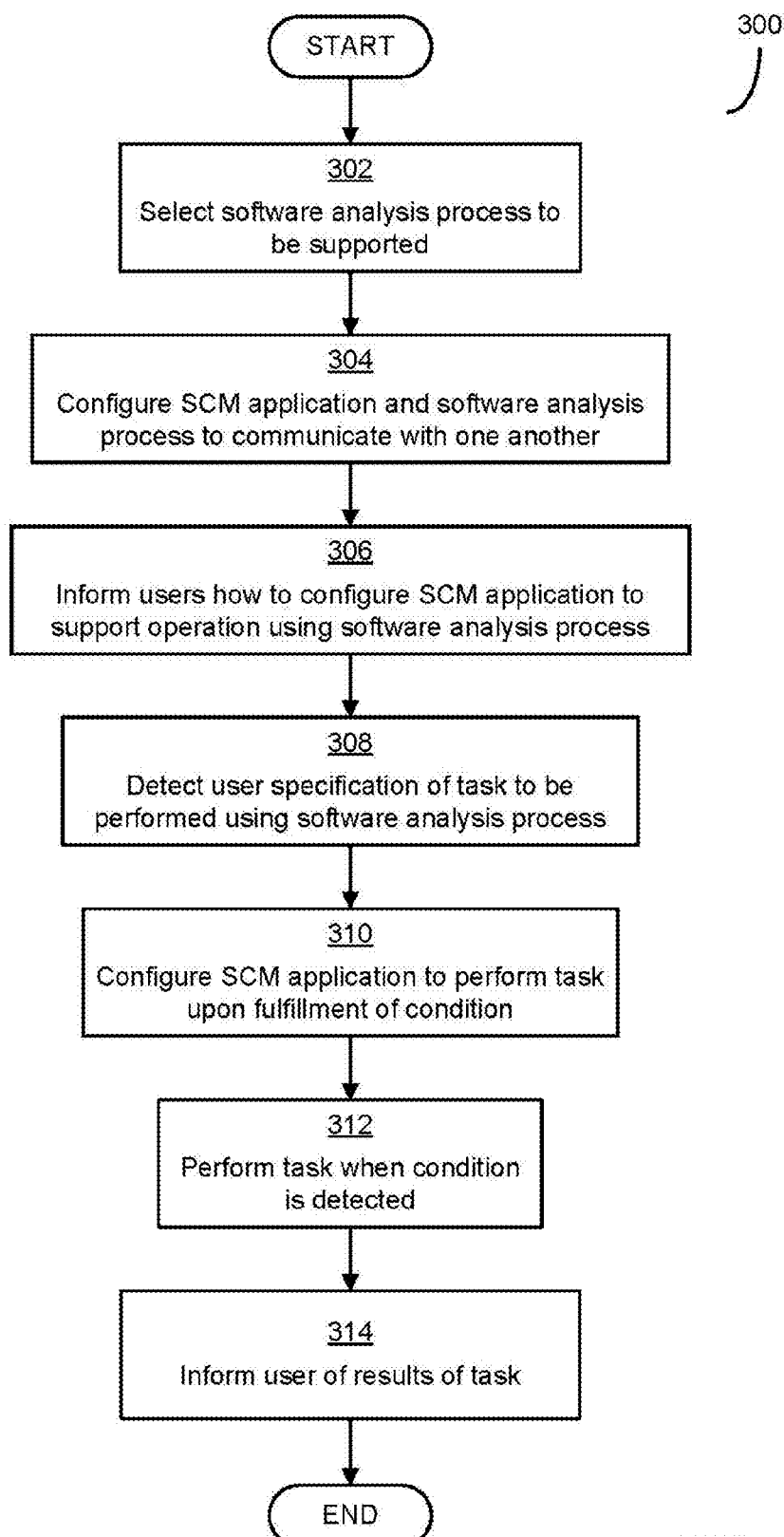
FIG. 3 is a flowchart of an illustrative process for automating performance of a software analysis process in accordance with techniques described herein.

FIG. 3 shows one exemplary process for carrying out automation of a software analysis process. The process 300 of FIG. 3 includes a start-to-finish process for automation that may be carried out for automating an analysis process, and includes acts that may be carried out by different parties at different times.

The process 300 begins in block 302, in which an administrator of an SCM application (such as the SCM 100 shown in FIG. 1) selects a software analysis process to be supported by the SCM application (i.e., selects an analysis process that will be eligible to be automated). Selecting the software analysis process may comprise selecting an application that executes a particular software analysis process or selecting a software analysis process from a set of software analysis processes executed by an application. The software analysis process selected in block 302 may be any suitable software analysis process, examples of which are given above.

In block 304, the administrator of the SCM application configures the SCM application to communicate with the application executing the selected software analysis process, and an administrator of the software analysis process application configures that application to communicate with the SCM application. This may be done in any suitable manner, including by establishing the interfaces 110 and 116 shown in FIG. 1. The configuration of block 304 may, in some cases, comprise establishing a connection between the applications over which information may be exchanged or, in other cases, may comprise configuring the applications to allow for such a connection to be formed.

The configuration of block 304 may also comprise, in some cases, configuring the SCM application and/or SAP application to support automation of the selected software analysis process, in addition to establishing or enabling the communication. For example, some configuration parameters for the selected analysis process may be input to the SCM application and/or SAP application. These configuration parameters may be general parameters that do not relate to specific task that may be carried out using the software analysis process, but rather relate to the software analysis process itself. For example, if the analysis process to be automated is a build process, the configuration of block 304 may comprise configuring the SCM/SAP applications with parameters for how comprehensive the build process should be (e.g., whether it should tolerate some minor errors, or report all errors), rather than specific parameters such as the software components and/or versions to be built or the condition upon which the process is to be executed. The configuration parameters of block 304 may be those of which an administrator is aware but that a user may not be, such that the user is not required to know these parameters to carry out other parts of the automation process.

In block 306, the administrator of the SCM application makes the users of the SCM application aware of the analysis process that was made available for automation in blocks 302 and 304, and instructs them on how the process can be automated by the users for particular tasks. This may comprise, for example, informing a user that the process has been to made a candidate for automation and what additional parameters need to be specified by the users to specify a task to carry out the process.

In some embodiments that use templates, blocks 304 and 306 may comprise an administrator creating a template, populating the template with the general parameters, and providing the template to users. The template may have fields including the general parameters and empty fields that may be populated by the users, where the empty fields relate to specific parameters for a task that are to be specified by a user to automate a task using the process. The empty fields may be provided to store information that is required or useful for specifying the task.

In other embodiments, however, the general parameters provided by the administrator may be used to configure an SCM and/or SAP application, for example, one or both of interfaces 110 and 116 of FIG. 1. These parameters may be used in automation of tasks, but may not be placed into a template or other file that may be used by a user or populated by a user.

In block 308, a user may provide additional parameters for a task, such as by populating a template or providing them in any other suitable manner. These additional parameters may relate to a task to be carried out using a software analysis process, such as a task that applies the software analysis process to specified software components based on occurrence of a specified event. The software components and the event may be parameters that are supplied in block 308 to specify the task. In embodiments that use templates, these specific parameters may be used to populate a template, though in other embodiments these specific parameters may be collected in any other suitable manner.

In block 310, the SCM application and/or the SAP application are configured with the information supplied by the administrator in block 304 and the information supplied by the user in block 308. This configuration may include configuring the SCM/SAP applications to perform a task upon fulfillment of a condition specified by a user, such that the SCM/SAP may be configured to monitor for fulfillment of these conditions in any suitable manner. The way in which events are monitored may change based on the conditions that are to be monitored. For example, if the condition is that a user has provided some input indicating that the task should be performed, user events may be monitored for fulfillment of the condition. If, on the other hand, the condition is that a change has been made to a software component or a version of a software project, the SCM application and/or a data store of the SCM application may be monitored for changes.

Another condition may be passage of time (e.g., where the task should be run once an hour or at another suitable interval) and monitoring for the condition may comprise monitoring a system time actively or configuring one or more interrupts to be run when the time condition is met.

Regardless of the condition and how it is detected, in block 312 the task may be performed when the condition is detected as fulfilled. This may comprise instructing an SAP application to carry out an analysis process described by the task.

In block 314, a user is informed of the results of the task. The results with which the user is informed may be intermediate results, such as an intermediate state of an analysis process or an indication that the analysis process is executing, or final results of the analysis process. These results may be presented to a user in any suitable manner, such as via a user interface of the SCM application. In some implementations, the SCM application may have a graphic or icon associated with the analysis process that may indicate at least some of the results. This graphic/icon may be a standalone graphic in the user interface or may be associated in the user interface with a software component or version that is being analyzed. In other implementations, a notification window may be presented in the user interface rather than a graphic, though any suitable indication may be presented to a user in any suitable manner.

Once the results of the analysis process are provided to the user, the process 300 ends.

As described above, the process 300 shows actions that may be taken by different parties at different times to configure an SCM application and/or an SAP application to perform a task that includes performing a software analysis process. For example, the actions of block 302-306 to make a process eligible for automation in a task may be taken well before a user acts in block 308 to specify a task using the process.

Figure 4:
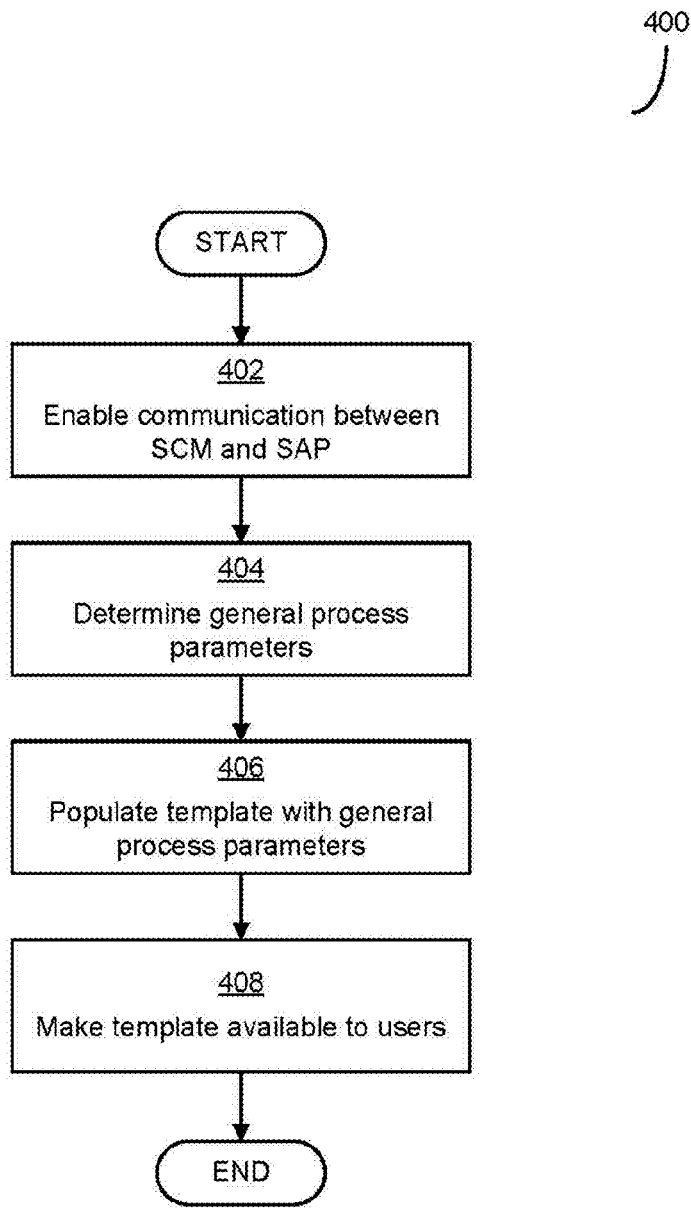
FIG. 4 is a flowchart of one exemplary process for creating and populating a template that may be used by a user to automate a software analysis process.

The process shown in FIGS. 4-7, however, show individual processes that may be carried out in some, but not all, embodiments by individual parties at specific times. For example, FIG. 4 shows a process that may be carried out by an administrator to make a software analysis process eligible for automation as part of a task.

Further, the processes of FIGS. 4-7 are described in connection with templates, and thus may be used in embodiments that use templates that are created by administrators and populated by users. It should be appreciated, though, that not all embodiments may use templates, and those that do may use any suitable template storing any useful or required information that was supplied by one or more parties, including one or more administrators to and/or one or more users.

The process 400 of FIG. 4 begins in block 402, in which an administrator of an SCM application may enable communication between the SCM application and an SAP application. This may comprise creating and/or configuring interfaces of the applications, or any other suitable action. Interfaces such as these (illustrated as interfaces 110 and 116 of FIG. 1) may be provided with information on how to exchange information between the SCM and SAP applications, including information on the manner of operations of those applications, the manner in which those applications store data, and a manner in which information may be supplied to those applications (e.g., written directly to a data store, or provided via an interface like an API). An interface may be provided with any suitable type or types of information to enable communication between an SCM and an SAP.

Further, while in FIG. 1 the exemplary system is shown with two interfaces 110 and 116, in some embodiments only one interface may be provided that exchanges information between the SCM and SAP and is adapted to communicate with both. Additionally, in some implementations that do use one or more interfaces, the interface(s) may be provided as a part of the application(s) or separate. Communication may be enabled in any suitable manner.

In block 404, the administrator also determines, for the software analysis process to be made available for automation, one or more general parameters of the software analysis process that are required or useful for the process to execute. These parameters may relate to a manner of execution of the process itself, rather than parameters regarding what the process will analyze. For example, some software analysis processes that may be automated may be shell programs that allow for execution of other programs. A build process, for example, may be a shell for other build processes. Operating in this way may allow the configuration of block 402 to be carried out more easily—enabling communication to the shell rather than many different processes would be quicker and more efficient. In this case, in block 404, a certain build process that would be run by the shell could be selected. Similarly, if different computing devices are eligible for executing a particular analysis process, the administrator may specify in block 404 which of these computing devices is to carry out the process.

In some embodiments, the parameters given in block 404 may be those that relate to the process itself and configure the process. A task may be created by a user that applies that process (configured with the parameters of block 404) to particular versions/software components of a software project upon occurrence of a particular event. The user may specify additional options or parameters that may govern how the process executes or the user may to be able to change parameters of a process that had been specified by the administrator, in some embodiments. However, specification of some parameters by an administrator in this way removes the necessity of knowing these parameters from a user. This allows a user to provide only the additional parameters and create a fully-specified task using a process with limited knowledge and ability on the part of the user.

As discussed above, the process 400 of FIG. 4 may be implemented in embodiments that use templates. Accordingly, the parameters specified in block 404 may be input in block 406 to a template for the software analysis process. The template may include various fields describing an analysis process and a task that includes performance of the analysis process. For example, the template may be created with fields populated with the parameters input by the administrator in block 404 and with empty fields that may be populated by a user with information describing a task that may make use of the process. These empty fields may include fields describing software components and/or versions of a software project that may be subjected to the process, conditions upon which the task shall be executed, and any other suitable information.

Accordingly, in block 408, when the template has been created and filled with the parameters input by the administrator, the template may be provided to users. Providing the template to users may be done in any suitable manner. For example, if the template was created for a particular user, the template may be transmitted to that user. If the template was created for general-purpose use, the template may be placed into a data store of templates, either on one or more central servers or on each user's machine, to make the template available to the user for the specification of a task. The process 400 then ends.

Figure 5:
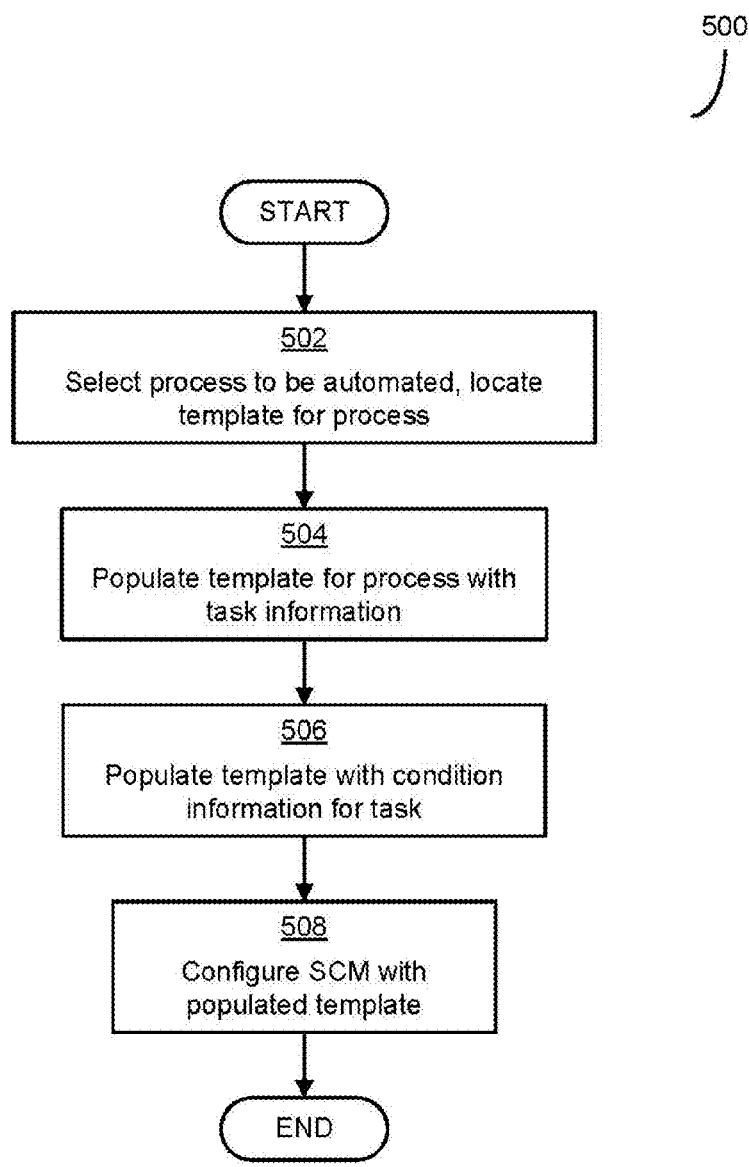
FIG. 5 is a flowchart of one exemplary process for populating a template for a software analysis process to cause execution of a specific operation by the software analysis process.

Process 500 of FIG. 5 is an exemplary process that may be carried out, in some embodiments, by a user seeking to automate a task that makes use of a software analysis process. The process 500 begins in block 502, in which the user selects a software analysis process that he/she wishes to perform during the task and locates a template that includes parameters describing the process. The template may be located in a data store on the user's machine or on a central server, or in any other suitable location.

In block 504, the template may be provided to the user via any suitable user interface, and the user may begin populating the template with information describing the task. The template, in some cases, may be displayed as a series of fields into which the user may enter information, or may be displayed as a series of prompts to the information for information to be inserted into the template. In the latter case, the SCM application that is creating the to interface may examine the template for empty fields and create suitable prompts for the information to be inserted into the empty fields. In other cases, an SCM application may infer information for the fields based on interactions with the user. For example, if the user asks to begin configuring a task while examining a particular software component or version, the SCM application may infer that the user would like to create a task relating to that version.

The parameters input by the user in block 504 may, in some cases, be input regarding a task to be performed using a process, rather that parameters regarding the process. For example, the administrator may input parameters describing a process to be carried out. The user may then elect to apply that process toward a particular goal, such as applying the process to a particular software component or version upon occurrence of a particular condition. This condition may be the occurrence of one or more events, either separately or in combination (e.g., "event 1 OR event 2" or "event 1 AND event 2"). The events may be related to any suitable user action, operation of an SCM application, operation of an SAP application (either relating to the process or a different SAP application), operation of another external process, expiration of a period of time, or any other suitable condition. In some cases, however, parameters of a task may include some parameters of a process, such as comprehensiveness of a test that is to be run by the process. Any suitable parameters may be input by the user.

In addition to receiving new information and inserting it into the templates in block 504, the user may, in some implementations, be enabled to change information previously stored in the template based on parameters input by the administrator. For example, if the administrator has specified a certain computing device that the process will be executed on, the user may be able to change that specification to select a different computing device. Or, if the administrator has selected that a comprehensive test be performed during the software analysis process, the user may be able to select a less inclusive test. In this way, while the administrator's input may remove the necessity of certain knowledge from a user, if a user is in possession of that knowledge the user may still specify fully the process they would like performed.

In block 506, upon receiving the information from the user, the information may be inserted into the template to specify the task.

In block 508, once a user has input all parameters and the template has been populated, the populated template may be used to configure the SCM application and/or SAP application (or other suitable component of the system) to perform the task. This may to comprise configuring an event monitor to monitor for a particular type or types of event(s), to determine whether conditions have been met. However, this configuration may not be limited to the SCM or SAP applications, or any particular component thereof. Any suitable component of the SCM and/or SAP application, or any other suitable application or process, may be configured according to the template to carry out a task that includes performing a particular software analysis process.

Figure 6:
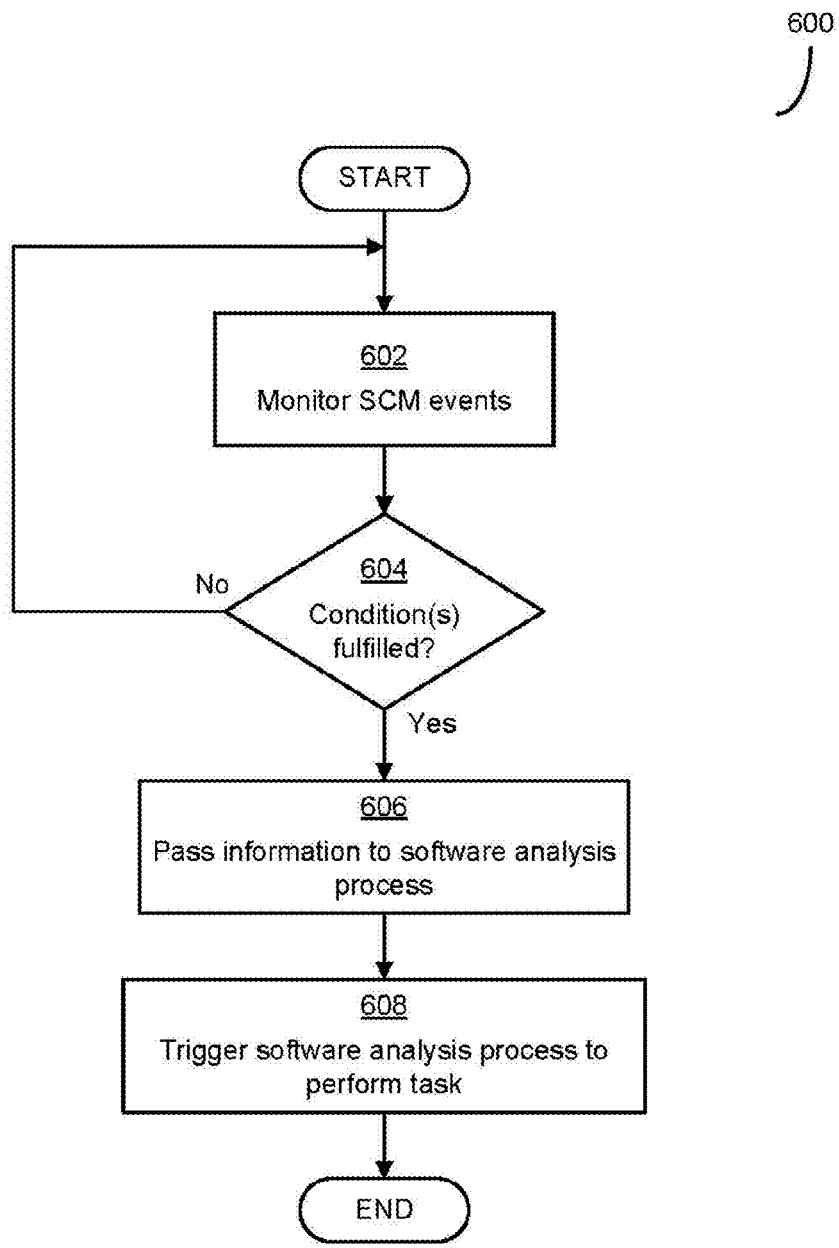
FIG. 6 is a flowchart of one illustrative process for carrying out a software analysis process on occurrence of an event.

The process 600 of FIG. 6 is an illustrative process that may be carried out by an SCM application that has been configured with a template to carry out a task. In the example of FIG. 6, the condition for the task is the occurrence of an event in the SCM application though, as discussed above, other conditions are possible.

The process 600 begins in block 602, in which an SCM application is monitoring SCM events to determine whether a condition has been fulfilled. For example, a condition may specify that a task be carried out on a version of a software project upon detection that new code has been added to that version (e.g., to ensure that the new code does not contain bugs or errors). In this case, the SCM application may be monitoring events in the SCM application to determine whether any of the events indicate that the version has changed. This may comprise examining an event log of the SCM application, monitoring actions as they are taken by the SCM application, monitoring information (e.g., records or files) in a data store associated with the version to determine whether the information has changed, or any other suitable action.

In block 604, a determination is made of whether condition(s) for the task have been met. If not, then processing for process 600 continues in block 602 with monitoring SCM events.

If the condition(s) is/are met, though, processing continues to block 606. In block 606, information regarding the task may be passed to an SAP application that is to execute a process as part of the task. This information may comprise, for example, the revised version of the software project that is to be analyzed and/or any other information that may be required or useful for the process. In block 608, the SAP application is triggered to start performing the process. The process 600 then ends.

In embodiments that operate according to the process shown in FIG. 6, configuration of the SAP application to perform the process may take place in whole or in part in block 606. In such embodiments, then, the information passed in block 606 may be all or part of the to information necessary to configure the SAP application to carry out the process. In other embodiments, the configuration may take place before the process 600 starts, so no information or only some information that is necessary to the software analysis process is exchanged in block 606. In various embodiments, any suitable information may be exchanged at any suitable time between an SCM application and an SAP application.

It should be appreciated that, as discussed above, process 600 of FIG. 6 is only one example of a type of process that may be carried out in some embodiments. Others are possible. For example, in some alternative embodiments, rather than the SCM application providing information to the SAP application in block 606, the SAP application may be monitoring actions of the SCM application and may retrieve the information regarding the version. In another example, the SCM application may trigger the SAP application to retrieve the information.

Figure 7:
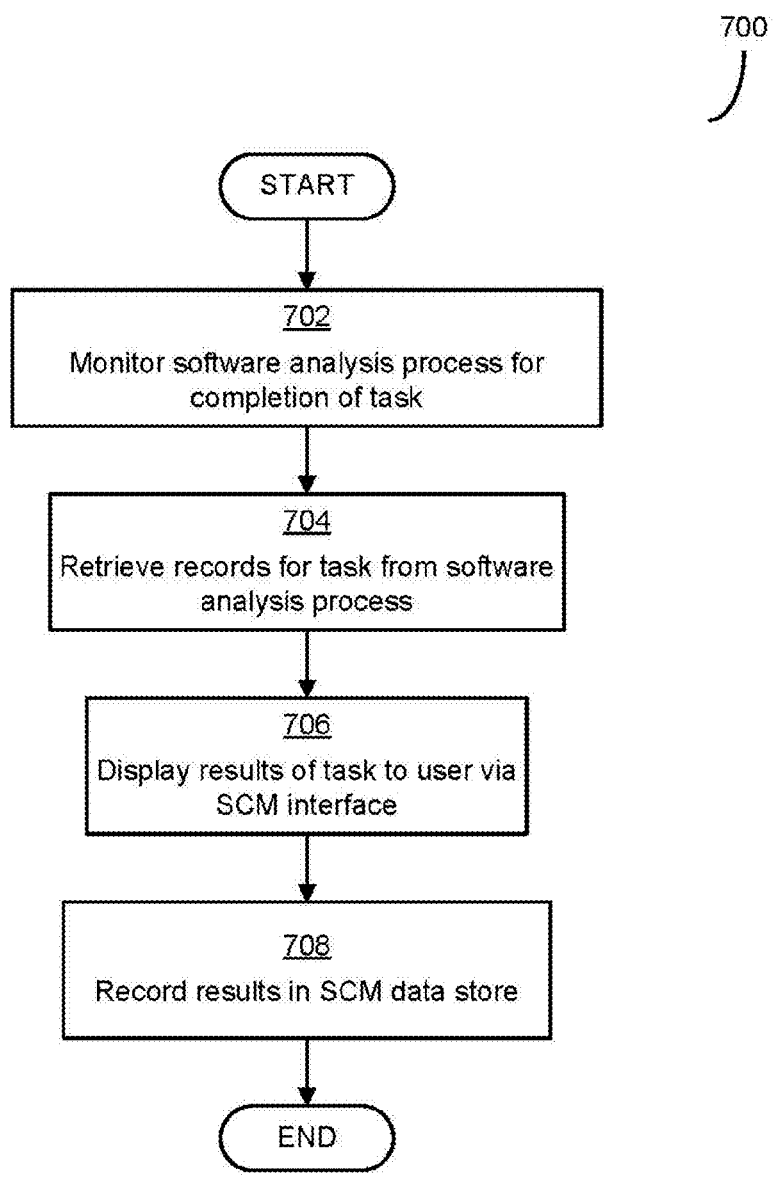
FIG. 7 is a flowchart of one exemplary process for reporting results of a software analysis process to a user.

FIG. 7 shows a flowchart of an illustrative process 700 for notifying a user of the SCM application regarding performance of the analysis process, once the analysis process is triggered. In block 702, once the analysis process is triggered, the analysis process may be monitored for completion. In block 704, once the analysis process is complete, any records generated during execution of the analysis process are retrieved and input to the SCM application.

In block 706, the SCM application may generate any suitable user interface, or alter/change any suitable component of a user interface, to display results of the task to the user of the SCM application that requested performance of the task. The user interface by which results are generated and displayed may be any suitable user interface, examples of which are given in FIGS. 11A and 11B and described below.

In block 708, results of the analysis process may also be recorded in a data store of the SCM application. For example, in some embodiments, an SCM application may store history information on analysis processes that have been carried out on software components/versions managed and stored by the SCM application. A user may then be able to display a history of the results of the analysis process, showing how the results have changed. A user may then be able to diagnose what led to the change. For example, if a particular version always fails a software analysis process at a particular time (e.g., Friday afternoon), and it is determined that a developer is submitting new software code to the version at that time, it may be determined that the user is submitting faulty code that should to be examined and corrected.

Once the records have been recorded in the SCM data store, the process 700 ends.

As discussed above, various embodiments may operate with any suitable SAP application executing any suitable process(es) as well as any suitable SCM application that manages and stores software configuration information (e.g., information on software components of software projects and/or versions of software projects) in any suitable manner. Embodiments are not limited to any particular SCM application or any particular type of SCM application.

Provided below is a description of one type of SCM application with which embodiments may operate, and an illustrative process for specifying a task to be carried out on SCM data stored by this type of SCM application. It should be appreciated, however, that this SCM application is only illustrative, and that others possible.

In some implementations, the SCM application described above may be an SCM application that stores information on versions of software projects. Version information may be stored by embodiments in any suitable manner, an example of which is streams. Further, streams may be implemented in any suitable manner in version- or process-based SCM applications, and may store any suitable information regarding a version in any suitable way. It should be appreciated, then, that embodiments which do operate with SCM applications that store version information are not limited to being implemented with SCM applications that store version information in any particular manner.

To facilitate further discussion of embodiments below, however, an overview of some exemplary configurations of streams for software projects is now provided. In the exemplary configurations, versions of a software project are maintained by a process-based system as streams. Streams are merely exemplary of the type of data structures that may be implemented in accordance with the techniques described herein, and process-based systems are merely an example of the type of version-based systems that may be implemented. Other implementations are possible.

Figure 8:
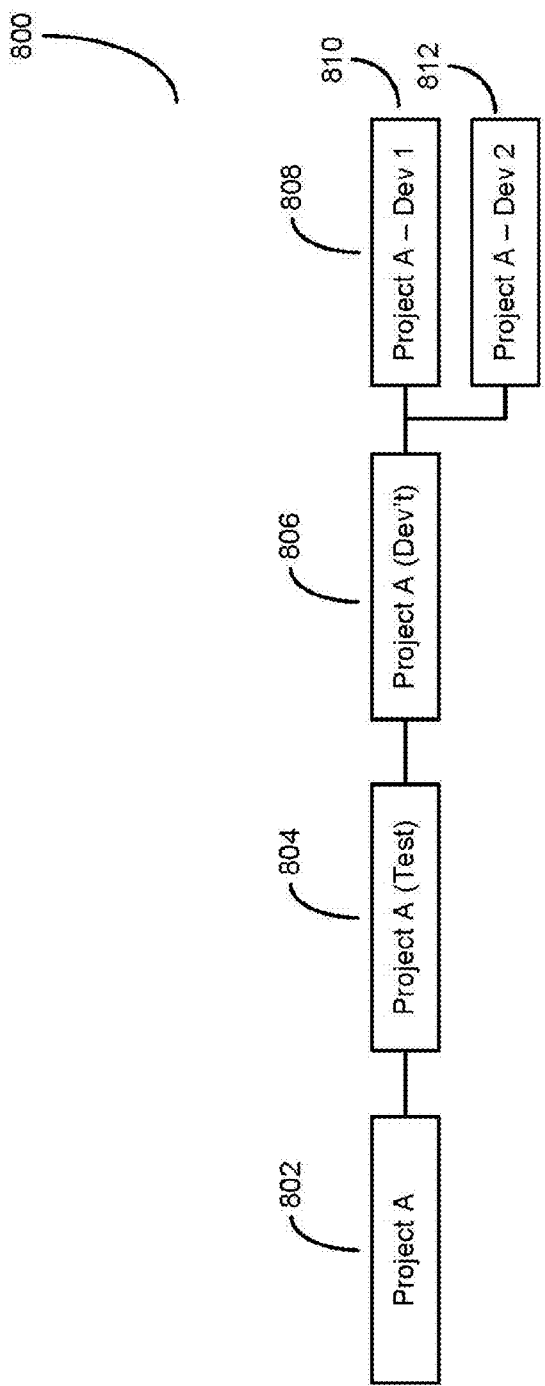
FIG. 8 is an exemplary version hierarchy which may be managed by some types of process-based software configuration management applications.

SCM applications in process-based systems may maintain versions of software projects in a version hierarchy. Thus, when versions are implemented as streams, a stream may be part of a stream hierarchy. A "stream hierarchy" (and, by abstraction, a version hierarchy) is a logical hierarchy of streams defining relationships between streams. As shown in FIG. 8 (discussed in greater detail below), a stream hierarchy may include at least one stream, the "source stream," which is at the highest level of the hierarchy (802) and is the stream from which the other streams of the hierarchy are ultimately derived. Thus, the source stream is said to be the "parent" of all other streams, and the other streams directly derived from it are (at least initially) its "children." In general, a stream having one or more children is a "parent stream" or "parent" of each of its child streams. A parent stream, including the source stream, may have one or more "children" or "child streams," each of which inherits one or more properties of the parent stream and its ancestors. For example, each child stream includes at least a subset of the directory elements (discussed below) included in its parent stream. A child stream may be derived directly (i.e., created from) its parent stream, though this is not always the case, as a stream's relative position within the hierarchy may change over time. As a result, a child stream may, at some time, have a parent from which the child was not originally derived.

Some SCM applications operating according to the principles described herein may implement one or more types of streams. For example, one type of stream is the one discussed above, which may describe a version of a software project and a set of software components associated with the version. Other types of streams may have additional functionality. For example, a "project stream" may be a stream in which the stream data structure (i.e., the base structure of the stream as discussed above) has an additional element which describes that the project stream is a source stream for a software project.

As another example, a workspace may be implemented as a stream having an additional element in the data structure indicating that changes may be made to the software components associated with the workspace. Accordingly, as used herein, a "workspace" is a type of stream in which a developer can make changes to the content of a software project (e.g., the software components of the software project). Workspaces, in some exemplary implementations, may be limited to being at the bottom of a stream hierarchy and any stream ancestry chains determined for the stream hierarchy. In some embodiments, workspaces are further configured such that they cannot have child streams; i.e., so that they cannot be a parent stream. Thus, in some embodiments, changes to a software project are made only in workspaces and then propagated to other streams according to techniques discussed in greater detail below.

As discussed briefly above, FIG. 8 shows an exemplary stream hierarchy for Project A 800 comprised of a plurality of streams. Stream 802 (marked Project A) may be considered the source stream for the stream hierarchy 800. Some of the child streams of stream 802, such as child streams 810 and 812, are represented as workspaces for developers (e.g., Workspace—Developer 1 (Dev 1) 810, Workspace—Developer 2 (Dev 2) 812, etc.). A developer may have a single workspace where all changes are made, or the developer may have multiple workspaces depending on which software project he or she is working. The stream hierarchy, in addition to the workspaces, has development stream 806, to which developers may propagate work done in their workspaces (e.g., changes made to one or more software components). Changes may be propagated up a hierarchy or propagated down in a hierarchy. As used herein, "promote" means to propagate up a hierarchy, whereas "update" means to propagate down through a hierarchy.

The stream hierarchy also has testing stream 804, which may hold streams for the projects that are used by test engineers such as Quality Assurance (QA) engineers to test the work done by the developers. In the stream hierarchy, software components may be propagated up the stream (i.e., "promoted") or may be propagated down the stream (i.e., "updated"). For example, a software component edited by Developer 1 may be promoted from workspace 810 of Developer 1 to the development stream 806 for Project A, and the versions of the software component of the other child streams of the development stream 806 (i.e., workspace 812 of Developer 2) may be updated.

In some exemplary implementations, properties of a version (e.g., the software component versions included in the version and/or a status of the version) may be determined in one or more ways. For example, in some implementations, the properties of a version may be determined based on inheritance rules and the parent versions of the version. In these implementations, when a change is made to a parent version, the child version will be updated with the change. As described in greater detail below, in some implementations, in some child versions—such as time-based versions and snapshots—these changes may be inherited up to a particular point in time and not thereafter. Some implementations may additionally or alternatively determine the properties of a version using include and exclude rules.

As used herein, an "include/exclude rule" or "I/E rule" is a rule specifying whether to include or exclude software components from a version. In some embodiments, if the software component is a directory, an I/E rule may specify whether to include or exclude one or more of the child elements of the directory from the version. Any of a variety of types of I/E rules may be used, including, but not limited to: an include rule, an include directory only (IDO) rule, and an exclude rule. An "exclude rule" is an I/E rule that, when defined for a directory of a version, specifies that the directory element and its child elements, if any (i.e., to if it is a directory), are excluded from the version. An "include rule" is an I/E rule that, when defined for a software component of a stream, specifies that the software component is included in the version. An include rule may also specify that each of the software component's child elements, if any (i.e., if it is a directory), are included in the version, unless an exclude rule has been defined for the child element. In other words, each child element of a software component for which an include rule has been specified are included in the version by default, unless an exclude has been specified for the child element. An "include directory only rule" or "IDO rule" is an I/E rule that can only be defined for software components which are directories, and not for files or other types of software components. When defined for a directory, an IDO rule specifies that the directory is included in a version; however, each of the directory's child elements, if any, are excluded from the version, unless an include rule has been defined for the child element. In other words, each child element of a directory for which an IDO rule has been specified are excluded from the version by default, unless an include rule or IDO rule (for directories only) has been specified for the child element.

I/E rules may be used to set the properties of a version by specifying, for example, the contents of a version. An include rule may be used, for example, to specify that a software component which is not a included in a parent version should be included in a version, while an exclude rule may, likewise, specify that a software component included in a parent version should not be included in a version.

It should be appreciated that the structures of software projects of FIG. 8 (e.g., the stream hierarchies) are merely exemplary, and that techniques operating according to some or all of the principles described herein are not limited to implementing the illustrative hierarchies and structures shown in FIG. 8. Methods and apparatuses operating according to the techniques described herein may implement any suitable structure for software projects and versions of software projects.

Figure 9:
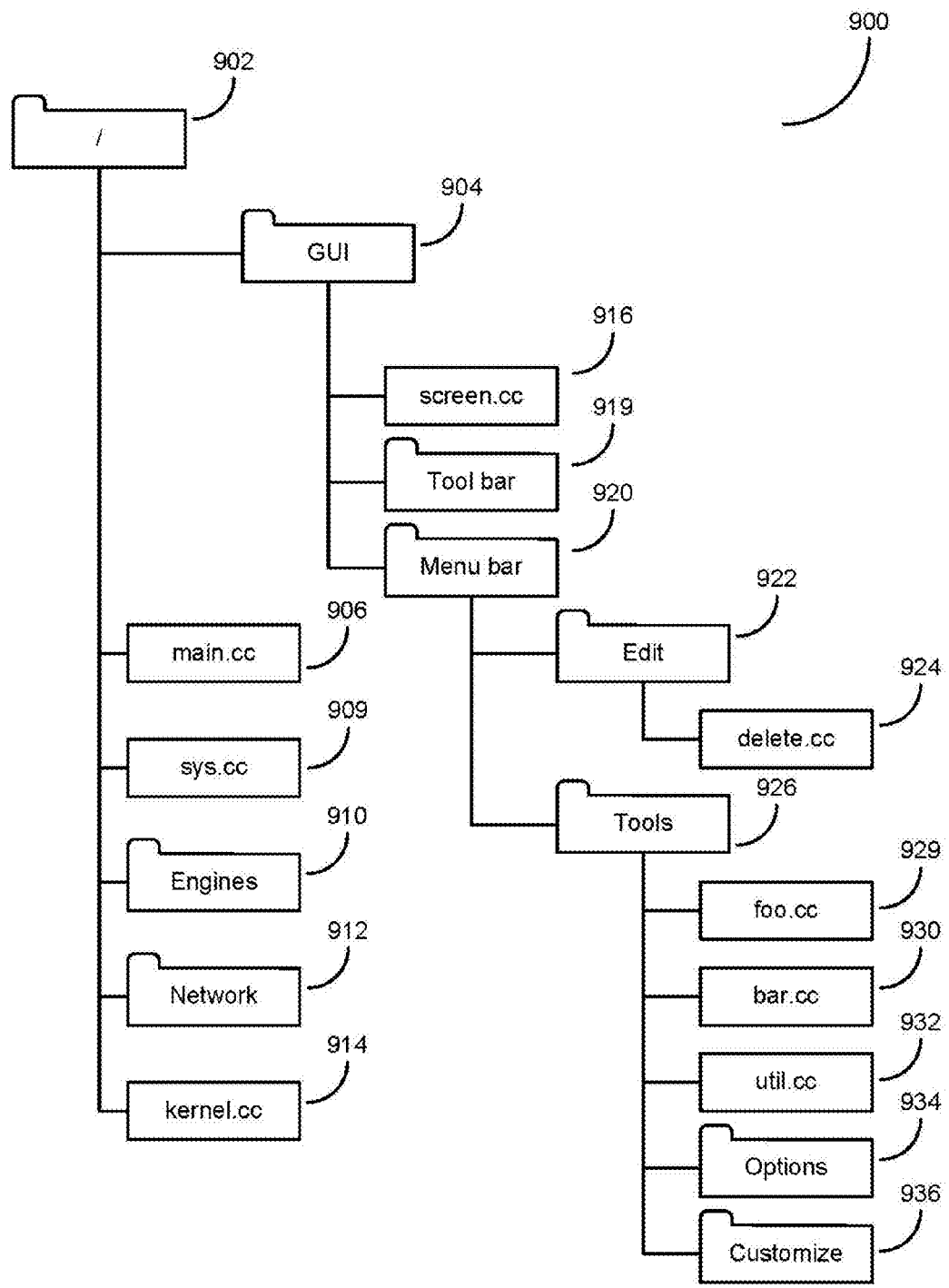
FIG. 9 is a diagram illustrating one example of a software component hierarchy that may be managed by some types of process-based software configuration management applications.

A version of a software project (e.g., a stream), as mentioned above, is a set of software components that may be related to the software project. As used herein, "software components" include any element of a software project. Software components may be, for example, a program, a file, a directory, a directory element, an object, a record, a table, another type of software component, and any combination thereof. As used herein, a "directly element" is a directory or a file. Additionally, elements of software projects, such as files, may be organized in a hierarchy. A "file hierarchy" is a logical hierarchy defining an organization of files. FIG. 9 illustrates an example of a file hierarchy. A file hierarchy includes at least a root directory 902 at a highest level of the hierarchy. The root directory may include, at a second level in the hierarchy, one or more directory elements. As used herein, a "directory element" is an element of a directory, and may be any of a variety of types of software components. For example, a file such as file 906 ("main.c") or a sub-directory such as sub-directory 904 ("GUI") may be directory elements. As used herein a "directory," including the root directory and any of its sub-directories, is a directory element (e.g., of a file hierarchy) that includes one or more other directory elements (e.g., files and/or directories).

As used herein, a "child element" or "child" of a directory is an element included within the directory at a level immediately below the level of the directory in the hierarchy, whereas any element included within the directory, regardless of level, is referred to as a "descendant element" or a "descendant" of the directory. For example, directory 914 is a child element of root directory 902, while directory 920 is a descendant element of root directory 902. Conversely, a directory is referred to herein as a "parent directory" or "parent" of any elements included in the directory at the level immediately below the directory, and is referred to as an "ancestor element" or "ancestor" of any included element, regardless of hierarchy level. Conceptually, a file hierarchy is not limited to a maximum number of levels, although in practice, this number may be limited by computation and storage capabilities of the system on which the file hierarchy is implemented.

In some exemplary implementations, each software component of a software project is assigned a unique identifier for the software component. The identifier preferably is "unique" in that it is assigned to the component on the component's creation and it stays with the component regardless of which version or versions the software component is a part or changes to the component made by a developer. The unique identifier, which in some implementations may be termed an element identifier (EID), may be any of a variety of types of identifiers, such as numerical, alphabetical, alpha-numerical, etc. If the component represented by an EID is a file or directory, providing a numerical value may avoid problems commonly encountered in known systems where an alphabetic identifier is used. For example, files and directories are frequently renamed, such that a current name of a file or directory may not be a same name that the file or directory had in the past. Further, the current name may be a name formerly used by another file or directory. The ability of a file or directory name to change over time, and the absence of another unique identifier that to remains constant, may create confusion and cause problems when an attempt is made to determine a status of a file or directory at a past time. For example, in some conventional SCM applications (e.g., some label-based systems), if an attempt is made to determine the status of a file in the past (e.g., by resorting to tape backup), and the file had a different name and another file had the file's current name, the wrong file may be identified and an incorrect status determined. This problem may be eliminated in time-systems operating according to the principles described herein by providing a unique numerical identifier for a file or a directory that remains constant throughout the life of a file or directory, regardless of whether the file's or directory's name is changed.

In addition to an EID, in some implementations, a software component may be associated with one or more other values indicating one or more versions of the software component. For example, a software component may be associated with one or more stream IDs, one or more instance IDs, one or more real stream IDs, one or more edition IDs, a transaction ID, and/or any other suitable identifier. These other identifiers may be used to identify "virtual versions" and "real versions" of the software component which are included in versions of the software project, though alternative implementations may not track real and virtual versions of software components and thus may not store these identifiers, or may store more or fewer identifiers to track version information in any other suitable manner.

A "virtual version" may be an instance of the software component. The virtual version may have the same content as, or different content than, other virtual versions of the software component, including the software component from which it was created. Thus, although it is common in the field of software configuration management to refer to different instances of a software component (e.g., components in different versions of a software project) as different "versions" of the component (even if the content of each "version" is in fact the same), such instances are referred to herein at "virtual versions."

Alternatively, a "real version" is an edition of a software component having different content than the previous real version of a software component from which the edition was created. Thus, if a change is made to a software component and recorded (as part of a project), a new real version of the software component may be created.

For example, referring to the version hierarchy shown in FIG. 8 and element hierarchy shown in FIG. 9, if file 806 were created in workspace 810 and promoted to version 806, the virtual version (i.e., instance) of file 906 in each stream would be different, although the real to version (i.e., edition) of the file would be the same. If file 906 were then edited in workspace 812, workspace 812 would have a different real version of file 906 than workspace 810.

As used herein, a "version" of a software component (e.g., a file) or a "software component version" means the real version of the software component, not the virtual version of the software component. Thus, in determining a software component version included in an issue resolution or a stream, the real version of the software component is determined. As discussed above, in some implementations, modifications to a software component (e.g., add, remove, change) are made in workspaces only. In such embodiments, each version (i.e., real version) of a software component may correspond to the workspace in which it was created.

A stream ID stored in association with a software component may, therefore, be used to represent the stream ID of the stream of a virtual version of the software component. An instance ID of the software component may be used to identify an instance of the virtual version of the software component. A stream ID and an instance ID may, then, be used to specify a stream/instance pair defining a virtual version of a software component. Likewise, a real stream ID and an edition ID of a software component may define a real version of a software component.

Table I shows an exemplary record for real and virtual versions of a software project. It should be appreciated that this record is merely illustrative, and that other implementations may store version information for software components in any suitable manner. For a given software component (e.g., file 906 of FIG. 9) with an EID of 2, a record for the software component stored by a SCM application may be:

TABLE I

| EID | Stream ID | Instance ID | Real Stream ID | Edition ID | Transaction # |
|---|---|---|---|---|---|
| 2 | 4 | 1 | 4 | 1 | 6 |
| 2 | 3 | 1 | 4 | 1 | 7 |
| 2 | 2 | 1 | 4 | 1 | 8 |
| 2 | 5 | 1 | 5 | 1 | 9 |
| 2 | 4 | 2 | 4 | 2 | 10 |
| 2 | 4 | 3 | 4 | 3 | 11 |
| 2 | 5 | 2 | 4 | 3 | 12 |
| 2 | 5 | 3 | 5 | 3 | 13 |

For the purposes of the exemplary record shown in Table I, and for further examples discussed below, Table II shows stream IDs for the streams shown in the exemplary version hierarchy of FIG. 8.

TABLE II

| Stream ID | FIG. 8 Identifier | FIG. 8 Name |
|---|---|---|
| 1 | 802 | Project A |
| 2 | 804 | Project A (Test) |
| 3 | 806 | Project A (Dev't) |
| 4 | 810 | Workspace - Dev. 1 |
| 5 | 812 | Workspace - Dev. 2 |

Each entry of Table I may specify a virtual version of a software component, the corresponding real version of the software component, and the transaction number of the transaction that created the virtual version of the software component. As shown in Table I, a software component with an EID of 2 (e.g., file 906 of FIG. 9), has five "real versions" created by developers: a first edition of file 906 created in stream 4, a second edition created in stream 4, a third edition created in stream 4, a first edition created in stream 5, and a third edition created in stream 5. As discussed above, a real version is defined by a real stream ID/edition ID pair. Table I also shows that file 906 is included in four different streams of the software project, streams 2, 3, 4, and 5, because each of those four streams includes a virtual version of the file, or a reference to a real version of the file. The virtual version of stream 1, for example, is a reference to the real version 4/1, the first edition of the file created in stream 4. Likewise, the virtual version 3/1 (the first instance of stream 3) is a reference to real version 4/1. As may be also seen from Table I, stream 5 initially created a new version of file 906 in real version 5/1, later included a virtual version 5/2 referencing the real version 4/3 of the file, and then later made its own edits to the file and created real version 5/3.

Table I, in addition to including fields regarding real and virtual versions of a software component, also includes a field for a transaction ID number for a transaction that created the real or virtual version. In some exemplary implementations, a SCM application may associate each action taken by a user and/or automated action taken by the SCM application itself with a transaction number, such that actions may be tracked and a user may be able to determine a sequential ordering of steps taken by the user, other users of the SCM application, and/or the SCM application. A transaction ID may be a sequential number, a time at which the action was taken, or any other suitable identifier. Associating actions with transaction IDs may be advantageous in a number of ways, such as aiding users in determining when errors were inserted into a software project, for example, and aiding users in "rolling back" changes that created errors. It should be appreciate that methods and apparatuses operating according to embodiments are not limited to implementing SCM applications tracking actions taken by users or the SCM applications, and that SCM applications implemented in accordance with the principles described herein may store any suitable information.

The transaction history shown in Table I may also be useful in creating two other types of versions: time-based versions and snapshots. These two types of versions (which may also be implemented as streams, in some implementations) may be created as children of a basis stream having a history. Where typical child versions, as described above, will inherit the current state of the parent version—and thus inherit any new software component versions that are promoted to the parent version—time-based streams and snapshots are versions which only inherit the contents and properties of a parent stream until a particular point in time. A time-based version or snapshot comprises a reference to a basis version as well as a reference to a particular point in time and/or transaction number at which to stop inheriting the state of the basis version. In a time-based version, additional edits may be made to the version (e.g., additional material added through include/exclude rules), and children versions may be added which may promote changes to the time-based version, but no changes made to the basis version (i.e., the parent version of the time-based stream) after the reference time/transaction will be inherited by the time-based stream. A snapshot, on the other hand, may be considered to be an immutable version. Once created, a snapshot may never be changed.

TABLE III

| EID | Parent Stream | Parent Edition | Child Stream | Child Edition |
|---|---|---|---|---|
| 2 | 4 | 1 | 5 | 1 |
| 2 | 4 | 1 | 4 | 2 |
| 2 | 4 | 2 | 4 | 3 |
| 2 | 4 | 3 | 5 | 3 |

Table III shows another exemplary data structure which may be implemented to track version ancestry for a file. Table III shows a record of parent/child relationships between real versions of a software component. As used herein, a "parent" version of a particular version of a software component is the version from which the particular version was created. Conversely, a "child" version of a particular version of a software component is a version created from the particular version. A new entry may be added to a record such as the one shown in Table III each time a transaction results in the creation of a new real version of a software component.

For each entry in Table III, an EID field may hold a value representing a unique identifier (e.g., a number) of a software component. The combination of values of the Parent Stream and Parent Edition fields may specify a unique stream/edition pair defining a real version of the software component specified by the EID field. This real version is the parent of the real version specified by the unique stream/edition pair specified by the Child Stream and Child Edition fields.

In some implementations, a data store of software components may store different real versions of a software component as a series of "deltas" or differences from a previous version. For example, the first version of a file maybe stored in full, while a second version of the file may be stored only as one or more references to deletions and/or additions that were made to the file between versions. When a version of a file is needed (for example, at build time for a software project or when a developer wants to view and/or edit the file), then the original file may be retrieved and any necessary additions and/or deletions made by versions between the original version and the version on which work is being done applied. In this manner, SCM applications implemented in accordance with these implementations may conserve disk space by not storing full copies of files.

SCM applications may additionally or alternatively store records for determining software components included in streams at particular times. Table IV shows exemplary data and fields that may be included in such records.

TABLE IV

| Stream ID | EID | Transaction # | In-progress? |
|---|---|---|---|
| 4 | 2 | 6 | 1 |
| 4 | 2 | 7 | 0 |
| 2 | 2 | 7 | 1 |
| 2 | 2 | 8 | 0 |
| 1 | 2 | 8 | 1 |
| 5 | 2 | 9 | 1 |
| 4 | 2 | 10 | 1 |
| 4 | 2 | 11 | 1 |
| 5 | 2 | 12 | 1 |
| 5 | 2 | 13 | 1 |

In Table IV, the stream ID field may hold a value specifying an ID of the stream to to which the entry in the record applies. EID field may hold the EID of the software component represented by the entry. The transaction number field, as mentioned above, may hold a value representing a transaction number or other value corresponding to a time at which the entry was made. The in-progress field may hold a value indicating whether the software component is in progress for the stream at the time corresponding to the value of the transaction field. As described above, a software component of a stream is "in progress" if a modification has been made to the software component (i.e., it has been added, modified, or removed) and the stream has not been promoted to a parent stream (i.e., propagated up in a version hierarchy). If a software component is in progress within a stream, then the version of the software component in the stream and its children may be different than the version of the software component elsewhere within the stream hierarchy. For example, the software component may not even exist in other streams in the hierarchy. Alternatively the software component may have been removed from the subject stream and its children, but still may be present in other stream of the stream hierarchy.

Having now described the arrangement of exemplary records which may be maintained by some exemplary implementations regarding software components and streams, examples of transactions that may result in the entries in Tables I, III, and IV will now be described. References may be made to the version hierarchy of FIG. 8, the element hierarchy of FIG. 9, and the stream IDs shown in Table II.

In transaction six, file 906 may have been created in workspace 810, resulting in the to creation of a new virtual version and a new real version of file 906. This transaction may have resulted in the first entries of Tables I and IV (i.e., those having a Transaction ID of 6). As indicated in Table IV, because file 906 is yet to be promoted from workspace 810 to stream 806, the in-progress field for the entry indicates that file 906 is in progress in workspace 810. The entry in Table I for this transaction indicates that the virtual version (4/1) and the real version (4/1) resulting from transaction six are the same.

Transaction six does not result in the creation of an entry in Table III because file 906 is a new file for which version ancestry has not yet been established.

In transaction 7, file 906 may be promoted from stream 810 to stream 806, resulting in the creation of a new virtual version of file 906. Transaction seven may result in the second and third entries of Table IV and the second entry of Table I. As indicated by the entries in Table IV, file 906 is no longer "in progress" in workspace 810, but is in-progress in stream 806. The entry in Table I indicates that the virtual version (i.e., stream/instance pair) 3/1 corresponds to the real version (i.e., stream/edition pair) 4/1. Transaction seven does not result in the creation of an entry in Table III because transaction seven did not result in the creation of a new real version of the file 906, but merely the creation of a new virtual version.

In transaction eight, file 906 may be promoted from stream 806 to stream 804, resulting in the creation of a new virtual version of file 906. Transaction eight may result in the fourth and fifth entries of Table IV and the third entry in Table I. Transaction eight does not result in the creation of an entry in Table III because a new real version of file 906 has not been created.

In transaction nine, file 906 may be modified in workspace 812 (in which file 906 was included because workspace 812 is a descendant stream of streams 804 and 806) and the modification recorded to create a new virtual version and new real version of file 906. Transaction nine may result in the sixth entry of Table IV, the fourth entry in Table I, and the first entry in Table III. The entry in Table III reflects that real version 5/1 was created from real version 4/1.

In transaction ten, file 906 may be modified in workspace 110 and the modification recorded to create a new virtual version and a new real version of file 906. Transaction ten may result in entry seven in Table IV, entry five in Table I, and entry two in Table III. The entry in Table III indicates that new real version 4/2 was created from real version 4/1.

In transaction eleven, file 906 may be modified in workspace 810 and the modification recorded to create a new virtual version and a new real version of file 806. Transaction eleven may result in the eighth entry in Table IV, the sixth entry in Table I, and the third entry in Table III.

In transaction twelve, file 906 may be sent from workspace 810 to workspace 812, thereby creating a new virtual version of file 906. In other words, rather than promoting a file from workspace 810 to stream 806 and stream 804, a user (e.g., a developer, project leader, etc.) may directly send (e.g., copy and paste) file 906 from workspace 810 to workspace 812, thereby replacing whatever version of file 906 currently resides in workspace 812. For example, a user interface (e.g., a GUI) may enable a user to specify file 906 (e.g., by typing in an identifier or selecting it from a user interface display), and send file 906 to workspace 812.

Transaction twelve may result in entry nine in Table IV and entry seven in Table I. The entry in Table I indicates that virtual version 5/2 of the file 906 created in workspace 812 corresponds to real version 4/3 of the software component in workspace 810. It should be appreciated that transaction twelve did not result in an entry in Table III because it did not result in the creation of a new real version.

In transaction thirteen, file 906 may be modified in workspace 812 and the modification recorded to create a new virtual version and a new real version of file 906. Transaction thirteen may result in the last entry in Tables I, III, and IV. The entry in Table III, as before, indicates that the new real version 5/3 of file 906 was created from real version 4/3 of file 906.

It should be appreciated that these exemplary transactions are merely illustrative of actions that may be supported by SCM applications implemented in accordance with the principles described herein and that in some exemplary implementations SCM applications may not support some of these actions or may support actions not described above. Further, it should be appreciated that the data structures and records described above in conjunction with Tables I-IV are merely exemplary and that some implementations of methods and apparatuses operating according to the principles described herein may maintain any suitable records implemented in any suitable data structures.

Figure 10:
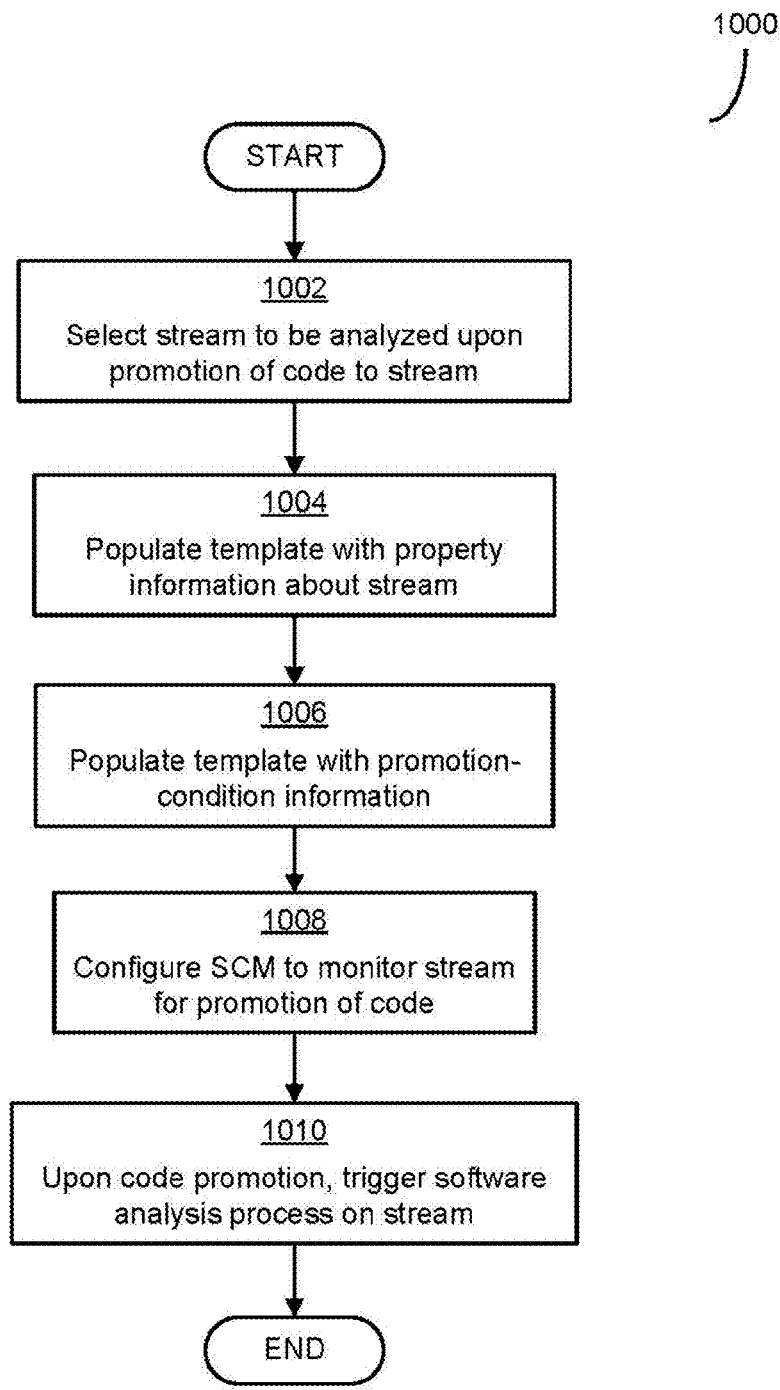
FIG. 10 is a flowchart of one illustrative process for automating performance of a software analysis process in a process-based SCM application.

Embodiments that operate with SCM applications that store version information as streams may operate in any suitable manner FIG. 10 shows one illustrative process for permitting a user to specify a task to be carried out that involves applying a software analysis process to a stream. This example uses templates, though, as discussed above, not all embodiments may use templates.

It should be appreciated that, prior to the execution of FIG. 10, various configuration actions may have been taken by an administrator of an SCM application to permit information to pass between the SCM application and the SAP application, particularly about streams. For example, the SAP application may be configured with knowledge about the structure and format of streams, such that it can receive information from the SCM application in stream format or such that it can retrieve information about streams from the SCM application.

The process 1000 begins in block 1002, in which a user selects a stream (i.e., a version) of a software project maintained by an SCM application for which a task is to be created. In the example of FIG. 10, the task is the performance of a software analysis process on the stream when it is detected that code has been promoted to the stream from a child stream or descendent of the selected stream. The software analysis process may be any suitable process, including a build process to determine whether there are any bugs in the stream following promotion.

In block 1004, parameters of the task (including the identity of the stream) are input to a template associated with the software analysis process. In block 1006, the template is populated with condition information indicating that the task is to be carried out upon detection that code has been promoted.

In block 1008, as discussed in other examples above, once the template has been populated the template may be used to configure an SCM application and/or an SAP application to perform the task. One action that may be taken in block 1008 is configuration of an event monitor to monitor the selected stream for a code promotion event and determine when the condition has been fulfilled.

In block 1010, when it is determined that the condition has been fulfilled, the software analysis process may be triggered to begin analyzing the stream. This may be carried out in any suitable manner. For example, in some embodiments, information on the stream—including software components of the stream, information on the software components, and/or information on the version—may be provided to the software analysis process or may be retrieved by the software analysis process. The process may be run, and results may be provided to a user and/or a data store of the SCM application as discussed above.

Exemplary Implementation

Various embodiments and implementations of aspects of the invention have been described above. In view of the foregoing, it should be appreciated that embodiments may be implemented in any suitable manner, and some embodiments may differ greatly from one another.

For clarity, an example of one implementation is given below. It should be appreciated, however, that this implementation is only illustrative. Other implementations are possible, and embodiments are not limited to performing any act or set of acts described below, nor are embodiments limited to having actions taken by the exemplary components described below as taking various actions.

One example of an automation process for a software analysis process is described below. In this example, the software analysis process is a build process available from Cruise Control and Thoughtworks, Inc., and the SCM application is a process-based SCM application available from AccuRev, Inc. It should be appreciated, however, that these implementations are only illustrative of the types of software analysis processes and SCM applications in which embodiments may operate.

In the exemplary process, the first step in automating execution of a software process in response to occurrence of an event is to open a communications channel between the external software analysis process (Cruise Control, in this example) and the SCM application (the AccuRev system, for example). As, in this example, both these products were developed using the Java programming language available from Sun Microsystems of Santa Clara, Calif., this communications channel may be opened using the Java Remote Method Invocation (RMI) interface available in each of these products. The Java RMI is a kind of application programming interface (API) available to Java-based applications that allows one application to make changes to another. Accordingly, AccuRev may use the Java RMI interface to, upon occurrence of an event, make changes to Cruise Control that will trigger execution of the software analysis process upon a specified version of the software project. In some implementations, one or more configuration actions may be necessary to allow two applications to communicate using a Java RMI. For a software development effort, these actions may be taken by an administrator of the computer system in which the software development effort is taking place, or any other person having knowledge of how the software analysis process works or is formatted. For example, the SCM application (AccuRev) may be provided with the functionality to make Java RMI calls to the external software analysis process (Cruise Control), and the external software analysis process provided with the functionality to receive calls from the SCM application. This functionality may be provided by enabling pre-existing functionality in both applications, by providing a plug-in to both applications that includes the functionality, by making changes to the code of the applications, or in any other suitable manner. It should be appreciated that the Java RMI, or any other API, may be used with applications that support APIs, and that a communications channel may be opened in different ways with different applications.

Once an administrator has configured AccuRev and Cruise Control to communicate over a communications channel, the administrator may configure one or more templates that may be used by developers to automate Cruise Control. In doing so, the administrator may provide in the template some of the information necessary for Cruise Control to carry out a software analysis process on a specified version, including information that may be beyond the knowledge of an ordinary developer. Table V shows one example of a template:

TABLE V

| Field | Value |
|---|---|
| Name | MyTemplate |
| Tool | Cruise Control |
| Build Process | Ant |
| Accurev.target | "build" |
| Test | "smoke" |
| Test.machine | <prompt> |
| ... | |

In the template, the name of the template and the external software analysis process may be specified. Other parameters may be specified as parameters of the external software analysis process. Cruise Control, as a framework for a continuous build process, carries out builds using other build tools, such as Ant, Exe, and Maven2. In Table V, the build process is specified as Ant. A default type of build may also be specified by keyword corresponding to types of builds maintained by the build process (Ant). The type of build may correspond to various build actions, such as building a portion of the software project (e.g., the client portion of a client/server project) or building the software project for a particular environment (e.g., a particular processor or a particular operating system). In this case, "build" is a keyword corresponding to a particular type of build to be carried out by Ant. Within the type of build, there may be other parameters, such as what type of test process to carry out. In this to case "smoke" may be a keyword corresponding to a "quick and easy build"—a "smoke test"—that checks for some errors, rather than a full build that may take longer but checks for more errors. The template may also include other parameters for which the developer will later be prompted to enter values, including the Test.machine parameter in which a user may specify a particular computing device to carry out the software analysis process in the event that multiple computing devices are available.

Once the administrator assembles the one or more templates, the templates may be made available to developers to automate build processes corresponding to specified versions of a software project. These may be scheduled, repetitive builds (e.g., build once a day at midnight), builds that take place on occurrence of an event, or builds that may be manually triggered by the developer from within the SCM application (AccuRev). As discussed above, using templates from within the SCM applications, developers are freed from the burden of knowing a great deal about the software analysis processes or even how to use them to specify build processes for particular applications.

To use the templates to specify build processes, a developer may populate the one or more fields of the template. Table VI shows the template of Table V populated with values entered by the developer.

TABLE VI

| Field | Value |
|---|---|
| Name | MyProcess |
| Template | MyTemplate |
| Tool | Cruise Control |
| URL | 192.168.0.2:8080 |
| AccuRev.cruisecontrol.rmi | 192.168.0.2:1099 |
| AccuRev.cruisecontrol.build | Ant |
| AccuRev.target | "buildXYZ" |

TABLE VI-continued

| Field | Value |
|---|---|
| AccuRev.wspace | "/opt/mywspace" |
| AccuRev.stream | myStream |
| Test | "smoke" |
| Test.machine | 192.168.0.1:8080 |

The populated template may specify various additional parameters that may be used by Cruise Control or by AccuRev when communicating with Cruise Control. For example, the URL, AccuRev.cruisecontrol.rmi, and Test.machine parameters may be used by AccuRev to establish communications with Cruise Control or with a particular instance of Cruise Control when it is running across multiple computing devices. Replacements for default options, such as the "build" option in the template, may also be input by the developer, such as here where "build" has been replaced by "buildXYZ," which may be another keyword for another type of build process. The developer may also specify a "workspace" in which Cruise to Control may execute the build process. A workspace may be, as here, a particular location on disk at which Cruise Control may store information. The developer may also specify a particular stream ("AccuRev.stream") or other version for which the developer wants a build process executed. Further, the developer may specify under what conditions the build should be performed on the specified version, such as upon occurrence of a promotion operation for code from a version lower in a version hierarchy than the specified version to the specified version, or based on a schedule.

Once the developer has populated the fields of the template that should be populated, the populated template may be passed to the communication channel functionality of AccuRev to be passed to Cruise Control. Various function calls may be made, examples of which are shown in an attached template. These functions may pass the information in the populated template to Cruise Control, and may also specify any other type of information that may be necessary. For example, Cruise Control includes functionality to report information about a build process to listeners and publishers. A listener may provide information about a status of a build, such as "In progress" or "Completed," and a publisher may provide more detailed information about the results of a build, such as a listing of errors found during the build process. A bootstrapper may also be specified, that launches the build process. Parameters relating to each of these modules, as well as the parameters from the template and from the developer, are provided to Cruise Control via the Java RMI interface. Through various Java RMI function calls, an entry is created in the Extensible Markup Language (XML) data store of Cruise Control relating to the build desired by the developer. This XML entry may take the following form:

```
<project name="MyProcess">
<bootstrappers>
<accurevbootstrapper workspace="/opt/mywspace"
    synctime="true"
    keep="false"
    verbose="true"/>
</bootstrappers>
<listeners>
    <accurevstatuslistener file="logs/${project.name}/status.txt"/>>
</listeners>
<modificationset>
<accurev stream="myStream"/>
```

```
</modificationset>
<schedule>
    <ant target="buildXYZ">
        <property name="Test" value="smoke"/>
        <property name="Test.machine" value="192.168.0.1:8080"/>
    </ant>
</schedule>
<publishers>
    <accurevpublisher stream="myStream"/>
</publishers>
</project>
```

Once the entry is created in Cruise Control, the configuration portion for an automated build may be concluded, and the build may be ready for execution. If the developer specified that the build should be carried out on occurrence of a promotion operation for the version, then the SCM application (AccuRev) may monitor the version in any suitable manner to determine when a promotion operation has taken place. When a promotion operation is detected, then AccuRev may perform operations specified by the template/developer to trigger the build process for the specified version. These operations may comprise issuing any suitable function calls to Cruise Control via the Java RMI interface. An exemplary set of function calls for Cruise Control is shown in an attached appendix.

When the build process of Cruise Control is triggered by AccuRev, the various modules specified in the configuration process may monitor the build process and report various information about the build to AccuRev so that the monitor can be informed of the build. For example, when a build process starts, a listener module monitoring Cruise Control may pass information about a status of the build back to AccuRev, including status information such as "Not running," "In progress," and "Complete." This information may be used by AccuRev to present various information to the user via the user interface. For example, an icon may be associated with the specified version in the user interface that informs the user of a status of software analysis processes associated with the version. When a listener module informs AccuRev of the status of one or more of these processes, then the icon may change correspondingly.

A publisher module may also pass information back to AccuRev, based on the results of the build process. When Cruise Control finishes executing the build process specified by the template/developer, the publisher module may provide to AccuRev a detailed analysis of the build process, as provided by Cruise Control. The detail analysis may provide an indication of whether the build succeeded or failed, a listing of any errors found in the version, any warnings regarding possible errors, and/or any other information that may be relevant to a build. This information may then be made available by AccuRev to the developer who requested the build of the version, and/or to any other developers reviewing the version. This information may be available via the user interface of AccuRev upon request by the user for a more detailed analysis of the build. For example, the user interface may provide a link to the information via the icon associated with the version (i.e., the icon updated by the information from the listener module) and updated based on the information from the listener module. If the developer selects the icon, AccuRev may display a new window containing the information from the publisher module. In some cases, the information available by the publisher module may not be the full information available about the build from Cruise Control. In such cases, AccuRev may also provide to the developer a link to Cruise Control that will open a user interface for Cruise Control that relates to the build of the specified version.

Once the information from the build process is made available to the developer by AccuRev, the process ends. It should be appreciated, however, that any number of software analysis processes may be implemented for a specified version, and that completion of one process may be a trigger for a second automated external software analysis process to start. The second software analysis process may be one adapted to analyze the version of the software project, or may be one adapted to analyze the results of the build process or any other automated process.

Further, it should be appreciated that, in some implementations, the information reported by the listener and/or publisher modules may be stored in a data store associated with the SCM application (AccuRev) along with information from previous builds such that a user, such as a developer, can consult a history of build information for a process. In this way, the user may be able to tell, for example, whether the build process has found a greater or fewer number of errors in the version over time.

It should be appreciated that the description given above of a technique for automating execution of a build process is only one example of techniques that may be used for automating a build process. Further, it should be appreciated that, as discussed above, a build process is only one example of the various types of software analysis processes that may be automated in accordance with the principles described herein, and that embodiments are not limited to operating with any particular software analysis process.

Exemplary User Interfaces

Figure 11A:
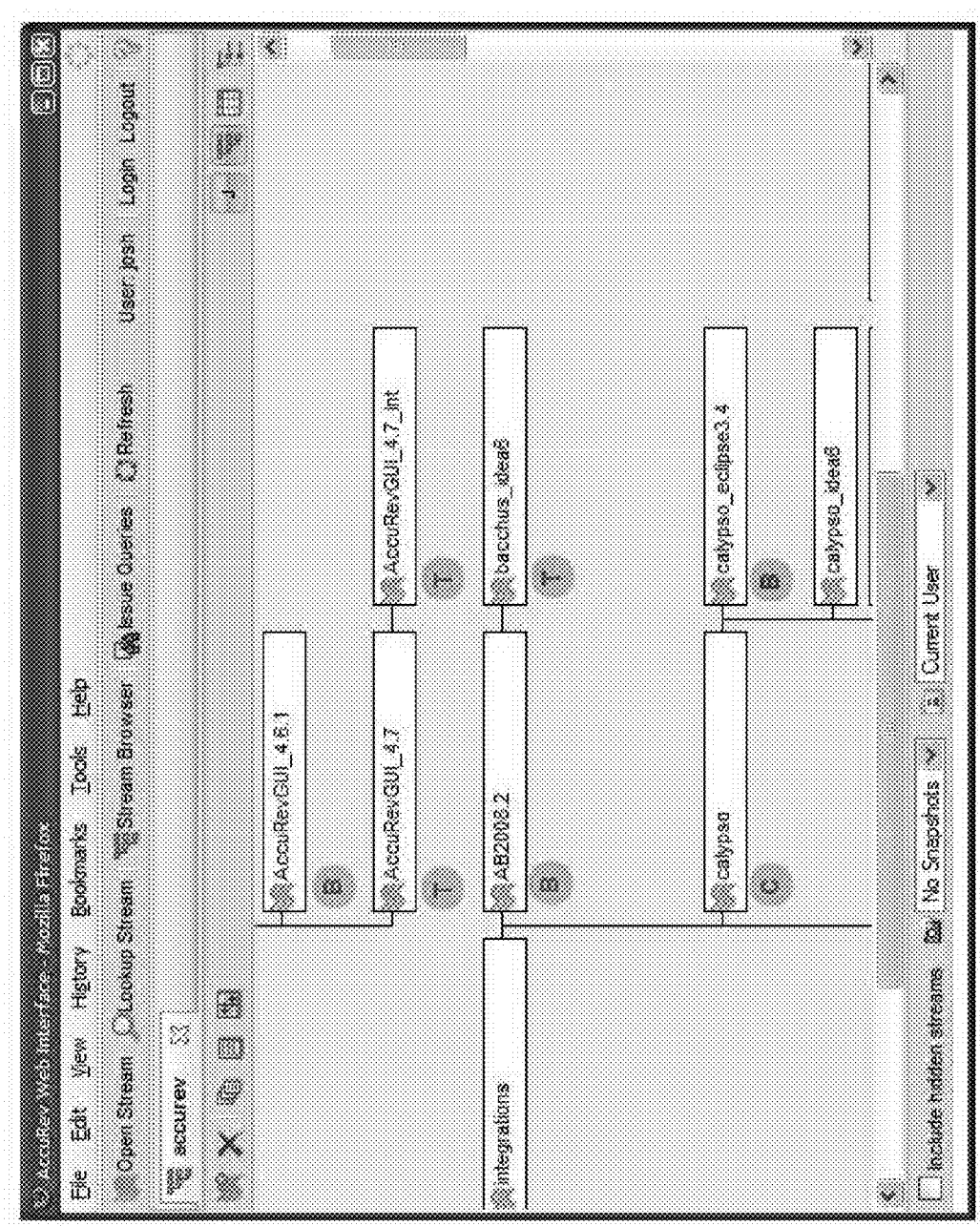
FIGS. 11A and 11B are screenshots of exemplary user interfaces that may be used to convey information to a user about results of software analysis processes.
Figure 11B:
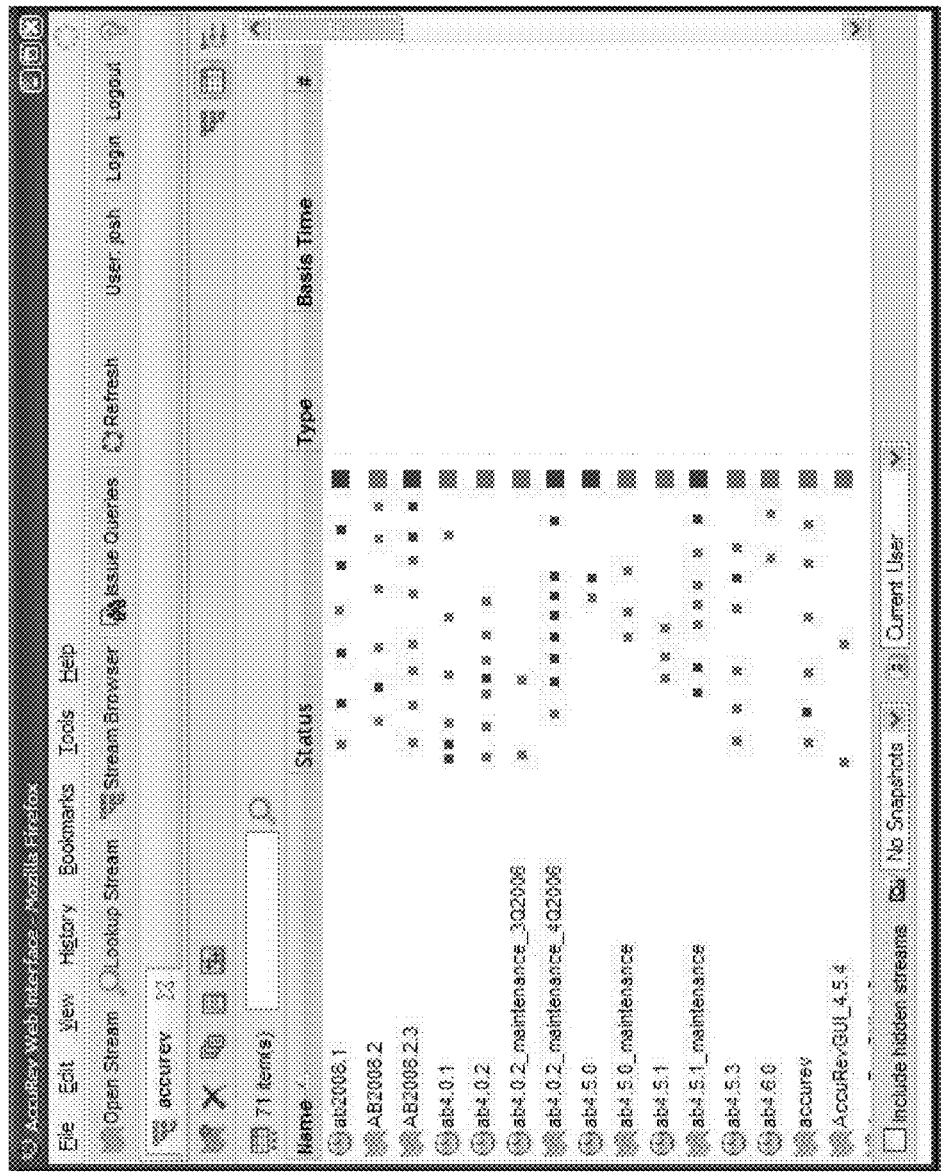

Embodiments may use any suitable user interface for presenting results of a software analysis process to a user. FIGS. 11A and 11B show two illustrative examples.

FIG. 11A shows one example of a user interface that may be used in a version-based SCM application like AccuRev 4.7. The interface shown in FIG. 11B shows various versions of a software project and relations between them. In the example, many of the versions of the software project having icons associated with them indicating tasks that have been established for those versions and a current status or most recent result of the task. In this example, when a software analysis process starts executing or finishes executing, intermediate and/or final results of the process may be used to adjust the icon associated with a version of the software project to which the process was applied. Colors, letters, or other indicators may be used to adjust the display based on result information provided by a software analysis process. In this way, a user may quickly see a status of the version. For example, if a build process was recently executed for the version and identified errors in the version, the icon for the version may be displayed red, indicating to any potential user of the version that it contains one or more errors that should be resolved before the version can be reliably used.

FIG. 11B shows another example of a user interface that may be used to display a history of results for tasks. The display of FIG. 11B is organized by version, and shows a large icon in each entry showing a current state of the The interfaces shown in FIGS. 11A and 11B may be displayed in any suitable manner. For example, in some embodiments, the interfaces may be interfaces of a software application to executing on a computing device. In other embodiments, the interfaces may be web pages that may be used to show a current status of a project.

Techniques operating according to the principles described herein may be implemented in any suitable manner. Included in the discussion above are a series of flow charts showing the steps and acts of various processes that automate performance of tasks that include performance of software analysis processes. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein without departing from the invention.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional to facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a software program application such as AccuRev 4.7. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable storage media to provide functionality to the storage media. These media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or to any other suitable storage media. Such a computer-readable storage medium may be implemented as computer-readable storage media 1206 of FIG. 12 described below (i.e., as a portion of a computing device 1200) or as a stand-alone, separate storage medium. It should be appreciated that, as used herein, a "computer-readable media," including "computer-readable storage media," refers to tangible storage media having at least one physical property that may be altered in some way during a process of recording data thereon. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIGS. 2A-2C. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 12:
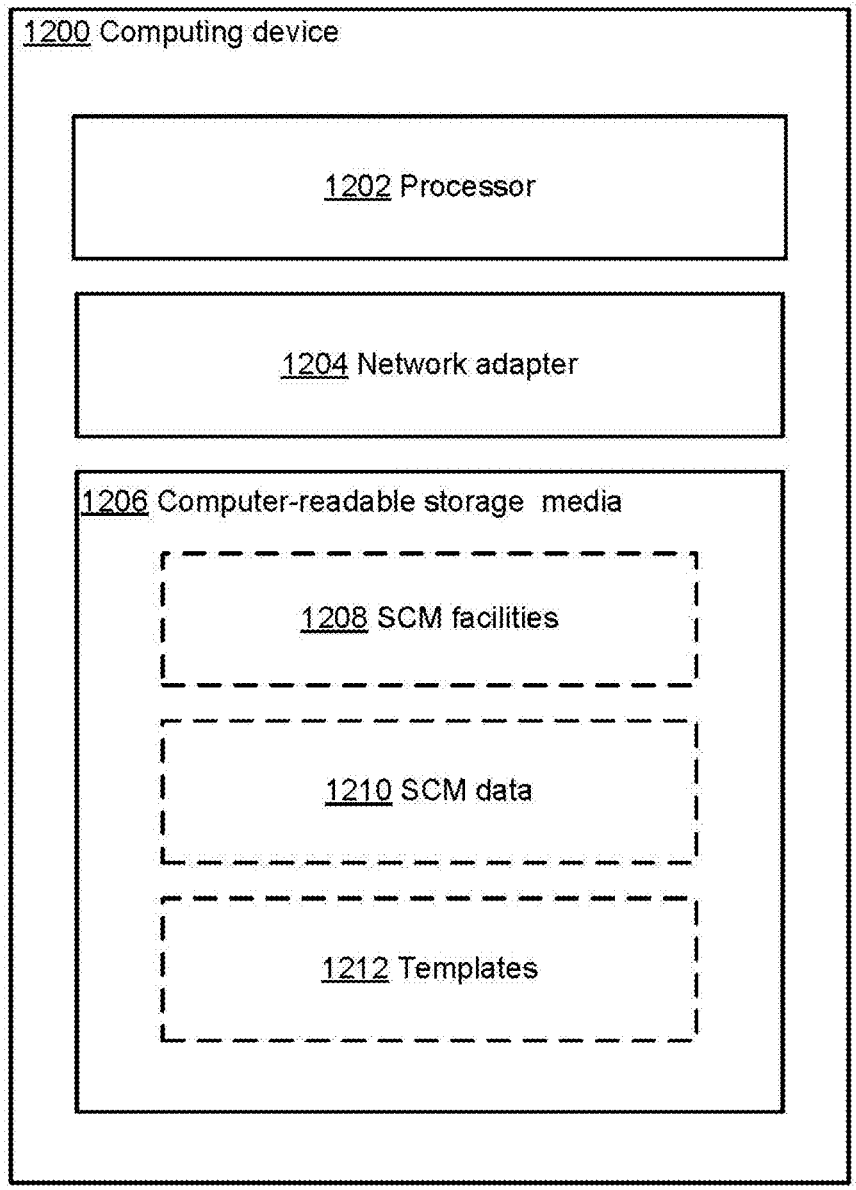
FIG. 12 is a block diagram of an exemplary computing device on which some embodiments may operate.

FIG. 12 illustrates one exemplary implementation of a computing device in the form of a computing device 1200 that may be used in a system implementing the techniques described herein, although others are possible. It should be appreciated that FIG. 12 is intended neither to be a depiction of necessary components for a computing device to operate in accordance with the principles described herein, nor a comprehensive depiction.

Computing device 1200 may comprise at least one processor 1202, a network adapter 1204, and computer-readable storage media 1206. Computing device 1200 may be, for example, a desktop or laptop personal computer, a server, a personal digital assistant (PDA), or any other suitable computing device. Network adapter 1204 may be any suitable hardware and/or software to enable the computing device 1200 to communicate wirelessly with any other suitable computing device over any suitable computing network. The computing network may include a wireless access point as well as any suitable wired and/or wireless communication medium or media for exchanging data between two or more computers, including the Internet. Computer-readable media 1206 may be adapted to store data to be to processed and/or instructions to be executed by processor 1202. Processor 1202 enables processing of data and execution of instructions. The data and instructions may be stored on the computer-readable storage media 1206 and may, for example, enable communication between components of the computing device 1200.

The data and instructions stored on computer-readable storage media 1206 may comprise computer-executable instructions implementing techniques which operate according to the principles described herein. In the example of FIG. 12, computer-readable storage media 1206 stores computer-executable instructions implementing various facilities and storing various information as described above. Computer-readable storage media 1206 may store software configuration management (SCM) facilities 1208 that may be adapted to execute an SCM application. The SCM facilities 1208 may be configurable to monitor the SCM application for occurrence of events (including SCM events and user actions) as well as to exchange data with a software analysis process (SAP) application. The computer-readable storage media 1206 may also include a data store 1210 of SCM data, which may include data on software components and/or versions of software projects maintained by the SCM application. Also, as shown in FIG. 12, the computer-readable storage media 1206 may include a data store 1212 of templates that may be used by a user of the SCM application to describe various tasks that apply software analysis processes to software components and/or versions of software projects.

While not illustrated in FIG. 12, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that the invention may be embodied as a method, of which an example has been provided. The acts performed as part of the method may be ordered in any suitable way. Accordingly, embodiments may be constructed in which acts are performed in an order different than illustrated, which may to include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope. Accordingly, the foregoing description and drawings are by way of example only.

What is claimed is:

1. A computer-implemented method for identifying a task to be carried out on a particular version of a software project, where information on the particular version is maintained by a software configuration management application and the task is to be performed by a software analysis process external to the software configuration management application, the method comprising:
   operating at least one processor to perform acts of:
   (A) receiving a selection, for the task, of a task template identifying a manner in which the software analysis process is configured to receive input of data regarding the particular version and instructions regarding the task to be performed by the software analysis process;
   (B) receiving customization information for the task from a user, the customization information comprising identifying information about the particular version and a condition upon which the task is to be performed; and
   (C) configuring, based on the task template, the identifying information, and the condition, an interface of the software configuration oration management application to instruct the software analysis process to perform the task on the particular version upon satisfaction of the condition.

2. The method of claim 1, wherein receiving the customization information in the act (B) further comprises receiving at least one parameter for the software analysis process that controls a manner in which the software analysis process performs an analysis.

3. The method of claim 1, further comprising:
   (D) receiving and storing at least one task template, each task template containing at least some information necessary for automation of a corresponding task and identifying additional information that may be used for automation of the corresponding task.

4. The method of claim 1, further comprising:
   (D) controlling a graphical user interface of the software configuration management application to display a status of the task following the configuring of the act (C).

5. The method of claim 1, wherein the configuring of the act (C) comprising configuring an interface of the software configuration management application corresponding to the software analysis process to be automated by the task.

6. At least one computer-readable storage medium encoded with computer-executable instructions that, when executed by at least one computer, cause the at least one computer to perform a method for identifying a task to be carried out on a particular version of a software project, where information on the particular version is maintained by a software configuration management application and the task is to be performed by a software analysis process external to the software configuration management application, the method comprising:
   (A) receiving a selection, for the task, of a task template identifying a manner in which the software analysis process is configured to receive input of data regarding the particular version and instructions regarding the task to be performed by the software analysis process;
   (B) receiving customization information for the task from a user, the customization information comprising identifying information about the particular version and a condition upon which the task is to be performed; and
   (C) configuring, based on the task template, the identifying information, and the condition, an interface of the software configuration management application to instruct the software analysis process to perform the task on the particular version upon satisfaction of the condition.

7. A method for enabling communication between a software configuration management application and a software analysis process external to the software configuration management application, the software configuration management application storing information on at least one version of a software project and the software analysis process being configured to analyze an input version, the method comprising:
   operating at least one processor to perform acts of:
   (A) defining a type of analysis operation to be performed on a version stored by the software configuration management application, the type of analysis operation being one that the software analysis process is configured to perform based on input regarding the version;
   (B) determining a manner in which the software analysis process is configured to receive the input regarding the version;
   (C) configuring a task template comprising at least a portion of the manner in which the software analysis process is configured to receive the input regarding the version, the task template not including information regarding the version; and
   (D) making the task template available to a user of the software configuration management application such that the user can populate the task template with information regarding a particular version and request that the type of analysis operation be performed on the particular version.

8. The method of claim 7, wherein the software configuration management application is executing on a first computing device and the software analysis process is executing on a second different computing device.

9. The method of claim 7, wherein determining in the act (B) comprises determining a first manner in which the software analysis process stores information regarding analysis to be performed and a second manner in which the software analysis process receives instructions.

10. The method of claim 7, wherein the task template comprises a first portion of the manner in which the software analysis process is configured to receive the input regarding the version, and
   wherein the method further comprises:
   (E) establishing an interface between the software configuration management application and the software analysis process and adapting the interface to communicate information between the software configuration management application and the software analysis process using a second portion.

11. The method of claim 10, wherein the task template made available in the act (D) defines the first portion and identifies additional information that may be used for automation of the task corresponding to the task template.

12. At least one computer-readable storage medium encoded with computer-executable instructions that, when executed by at least one computer, cause the at least one computer to perform a method for enabling communication between a software configuration management application and a software analysis process external to the software configuration management application, the software configuration management application storing information on at least one version of a software project and the software analysis process being configured to analyze an input version, the method comprising:
   (A) defining a type of analysis operation to be performed on a version stored by the software configuration management application, the type of analysis operation being one that the software analysis process is configured to perform based on input regarding the version;
   (B) determining a manner in which the software analysis process is configured to receive the input regarding the version;
   (C) configuring a task template comprising at least a portion of the manner in which the software analysis process is configured to receive the input regarding the version, the task template not including information regarding the version; and
   (D) making the task template available to a user of the software configuration management application such that the user can populate the task template with information regarding a particular version and request that the type of analysis operation be performed on the particular version.

13. A computer-implemented method for enabling communication between a software configuration management application and a software analysis process external to the software configuration management application, the software configuration management application storing information on at least one version of a software project and the software analysis process being configured to analyze an input version, the method comprising:
   operating at least one processor to perform acts of:
   (A) identifying a type of task that the software analysis process is configured to perform;
   (B) determining a trigger by which the software analysis process is configured to start the type of task;
   (C) determining an input manner in which the software analysis process is configured to receive input regarding a version of a software project to be analyzed;
   (D) configuring the software configuration management application to transmit, upon receipt of an instruction from within the software configuration management application to trigger the type of task for a particular version of a software project, information about the particular version and the type of task to the software analysis process in accordance with the trigger and the input manner; and
   (E) making available to a user of the software configuration management application a task template defining at least a portion of the input manner and identifying additional information that the user may provide to customize the type of task corresponding to the task template, the additional information comprising information about the particular version and a condition upon which the type of task should be carried out.

14. At least one computer-readable storage medium encoded with computer-executable instructions that, when executed by at least one computer, cause the at least one computer to perform a method for enabling communication between a software configuration management application and a software analysis process external to the software configuration management application, the software configuration management application storing information on at least one version of a software project and the software analysis process being configured to analyze an input version, the method comprising:
(A) identifying a type of task that the software analysis process is configured to perform;
(B) determining a trigger by which the software analysis process is configured to start the type of task;
(C) determining an input manner in which the software analysis process is configured to receive input regarding a version of a software project to be analyzed;
(D) configuring the software configuration management application to transmit, upon receipt of an instruction from within the software configuration management application to trigger the type of task for a particular version of a software project, information about the particular version and the type of task to the software analysis process in accordance with the trigger and the input manner; and
(E) making available to a user of the software configuration management application a task template defining at least a portion of the input manner and identifying additional information that the user may provide to customize the type of task corresponding to the task template, the additional information comprising information about the particular version and a condition upon which the type of task should be carried out.

15. A computer-implemented method for coupling a software configuration management (SCM) application and at least one external software analysis process such that, on occurrence of an event relating to a version of a software development project managed by the SCM application, the SCM application can trigger the at least one software analysis process to analyze the version, the version being stored by the SCM application as a logical grouping of one or more software components included in the version and information relating to properties of the version, the method comprising:
operating at least one processor of at least one computing device to perform acts of:
(A) accepting first input from an administrator of the SCM application configuring a communications channel over which the SCM application will transmit information to the at least one external software analysis process;
(B) accepting second input from the administrator of the SCM application creating a template for providing information to the at least one external software analysis process regarding an event associated with a version of a software development project managed by the SCM application;
(C) accepting third input from a user of the SCM application configuring an event handler to monitor for occurrence of at least one specific event associated with at least one specific version, the event handler being configured by populating the template with the third input specifying at least the at least one specific event and the at least one specific version;
(D) on occurrence of the at least one specific event, providing information regarding the specific version to the at least one external software analysis process over the communications channel without performing any action to configure the channel to provide the information; and
(E) notifying a user, via a user interface of the SCM application, of a completion status of the at least one external software analysis process.

16. The computer-implemented method of claim 15, wherein the information is provided in act (D) in response to a request from the at least one external software analysis process.

17. The computer-implemented method of claim 16, wherein the request is made by the at least one external software analysis process as part of a polling process.

18. The computer-implemented method of claim 15, wherein the information is provided in act (D) in response to a detection by the SCM application of the occurrence of the at least one specified event.

19. The computer-implemented method of claim 18, wherein the information is provided to the at least one external software analysis process via at least one application programming interface (API) function call.

20. The computer-implemented method of claim 15, wherein the at least one specified event is that a change was made to software code of the version of the software development project.

21. The computer-implemented method of claim 20, wherein said change is that the code of the version includes code relating to a software development task that was promoted from a second version of the software development project lower than the version in a version hierarchy.

22. The computer-implemented method of claim 15, wherein the at least one specified event is occurrence of a designated time at which the software analysis process should be run.

23. The computer-implemented method of claim 22, wherein the designated time is a periodic time according to a schedule.

24. The computer-implemented method of claim 15, wherein the at least one external software analysis process comprises a build process, and the completion status of the at least one external software analysis process comprises a determination of whether errors were identified by the build process during a build of the version.

25. The computer-implemented method of claim 15, wherein the at least one external software analysis process comprises a code complexity check process, and the completion status of the at least one external software analysis process comprises a determination of whether the version is within threshold complexity levels by the code complexity check process.

26. The computer-implemented method of claim 15, wherein the at least one external software analysis process comprises a memory check process, and the completion status of the at least one external software analysis process comprises a determination of whether the version does not include memory leaks.

27. The computer-implemented method of claim 15, wherein notifying a user of the completion status comprises notifying according to notification criteria established by the user.

28. The computer-implemented method of claim 27, wherein notifying the user comprises updating a portion of the user interface associated with the version of the software development project to indicate the completion status.

29. The computer-implemented method of claim 27, wherein the notification criteria include settings on a type of result to report and/or a manner in which to report the completion status.

30. The computer-implemented method of claim 15, wherein the version of the software development project is a stream.

31. At least one computer-readable storage medium encoded with computer executable instructions that, when executed by a computer, cause the computer to carry out a method for coupling a software configuration management (SCM) application and at least one external software analysis process such that, on occurrence of an event relating to a version of a software development project managed by the SCM application, the SCM application can trigger the at least one software analysis process to analyze the version, the version being stored by the SCM application as a logical grouping of one or more software components included in the version and information relating to properties of the version, the method comprising:

(A) accepting first input from an administrator of the SCM application configuring a communications channel over which the SCM application will transmit information to the at least one external software analysis process;

(B) accepting second input from the administrator of the SCM application creating a template for providing information to the at least one external software analysis process regarding an event associated with a version of a software development project managed by the SCM application;

(C) accepting third input from a user of the SCM application configuring an event handler to monitor for occurrence of at least one specific event associated with at least one specific version, the event handler being configured by populating the template with the third input specifying at least the at least one specific event and the at least one specific version;

(D) on occurrence of the at least one specific event, providing information regarding the specific version to the at least one external software analysis process over the communications channel without performing any action to configure the channel to provide the information; and (E) notifying a user, via a user interface of the SCM application, of a completion status of the at least one external software analysis process.

\* \* \* \* \*